(12) United States Patent
Park et al.

(10) Patent No.: US 11,906,618 B2
(45) Date of Patent: Feb. 20, 2024

(54) MIMO RADAR APPARATUSES AND MIMO RADAR METHODS

(71) Applicant: Infineon Technologies AG, Neubiberg (DE)

(72) Inventors: Byung Kwon Park, Seongnam (KR); Sang Ho Nam, Yongin (KR)

(73) Assignee: Infineon Technologies AG, Neubiberg (DE)

( * ) Notice: Subject to any disclaimer, the term of this patent is extended or adjusted under 35 U.S.C. 154(b) by 344 days.

(21) Appl. No.: 17/233,715

(22) Filed: Apr. 19, 2021

(65) Prior Publication Data
US 2021/0333386 A1 Oct. 28, 2021

(30) Foreign Application Priority Data

Apr. 28, 2020 (DE) .......................... 102020111533.4

(51) Int. Cl.
*G01S 13/58* (2006.01)
*G01S 7/35* (2006.01)

(52) U.S. Cl.
CPC ............ *G01S 13/584* (2013.01); *G01S 7/352* (2013.01)

(58) Field of Classification Search
CPC ................................ G01S 13/584; G01S 7/352
USPC ....................................................... 342/107
See application file for complete search history.

(56) References Cited

U.S. PATENT DOCUMENTS

| | | | | |
|---|---|---|---|---|
| 4,532,603 A * | 7/1985 | Gerard | ................. | G01S 13/282 708/821 |
| 6,236,365 B1 * | 5/2001 | LeBlanc | ............... | G01S 5/0009 342/450 |
| 8,854,252 B2 * | 10/2014 | Holder | .................. | H04B 7/086 342/107 |
| 11,644,529 B2 * | 5/2023 | Gulati | .................. | G01S 13/343 342/173 |
| 11,656,322 B2 * | 5/2023 | Aydogdu | ............. | G01S 13/343 342/60 |
| 2002/0122502 A1 * | 9/2002 | El-Gamal | ............. | H04L 1/0059 375/267 |

(Continued)

FOREIGN PATENT DOCUMENTS

| | | | |
|---|---|---|---|
| EP | 3187894 B1 | 7/2017 | |
| WO | WO-2017187331 A1 * | 11/2017 | ......... G01S 13/0209 |

OTHER PUBLICATIONS

Hammons A.R., et al., "On the Theory of Space-time Codes for PSK Modulation," IEEE Transactions on Information Theory, Mar. 2000, vol. 46(2), pp. 525-542 (Year: 2000).*

*Primary Examiner* — Nuzhat Pervin
(74) *Attorney, Agent, or Firm* — Harrity & Harrity, LLP

(57) ABSTRACT

The present disclosure relates to a hybrid multiple-input multiple-output (MIMO) radar concept. Via a first subset of a plurality of transmit channels and during a first time interval, first frequency-modulated continuous-wave (FMCW) radar signals are con-currently transmitted with different phase offsets among different transmit channels of the first subset in accordance with a first predefined code division multiplexing scheme. Via a second subset of the transmit channels and during a second time interval subsequent to the first time interval, second FMCW radar signals are concurrently transmitted with different phase offsets among different transmit channels of the second subset in accordance with a second predefined code division multiplexing scheme.

20 Claims, 15 Drawing Sheets

(56) References Cited

U.S. PATENT DOCUMENTS

| | | | |
|---|---|---|---|
| 2003/0146871 A1* | 8/2003 | Karr | G01S 5/0009 |
| | | | 342/465 |
| 2017/0212217 A1* | 7/2017 | Bergin | G01S 13/9029 |
| 2017/0310758 A1* | 10/2017 | Davis | G01S 13/931 |
| 2018/0172813 A1* | 6/2018 | Rao | G01S 13/343 |
| 2020/0182991 A1* | 6/2020 | Hakobyan | H04B 7/0413 |
| 2021/0111848 A1* | 4/2021 | Chen | H04L 5/0048 |
| 2021/0173042 A1* | 6/2021 | Wu | G01S 13/584 |
| 2021/0173069 A1* | 6/2021 | Wu | G01S 7/352 |
| 2021/0278518 A1* | 9/2021 | Xin | H01Q 25/008 |
| 2021/0293946 A1* | 9/2021 | Kishigami | G01S 13/282 |
| 2021/0296783 A1* | 9/2021 | Rostomyan | H01Q 1/2283 |
| 2021/0302560 A1* | 9/2021 | Kishigami | G01S 13/5246 |

* cited by examiner

Time division multiple access

Code division multiple access

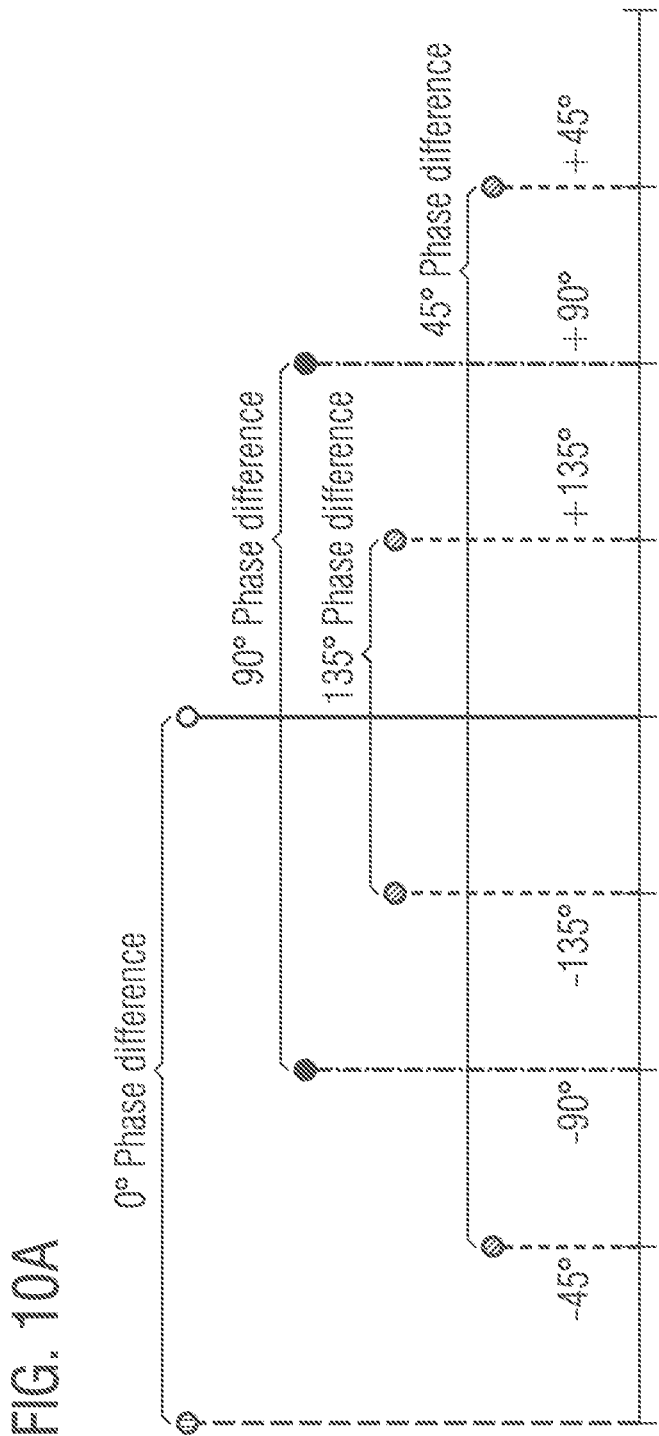

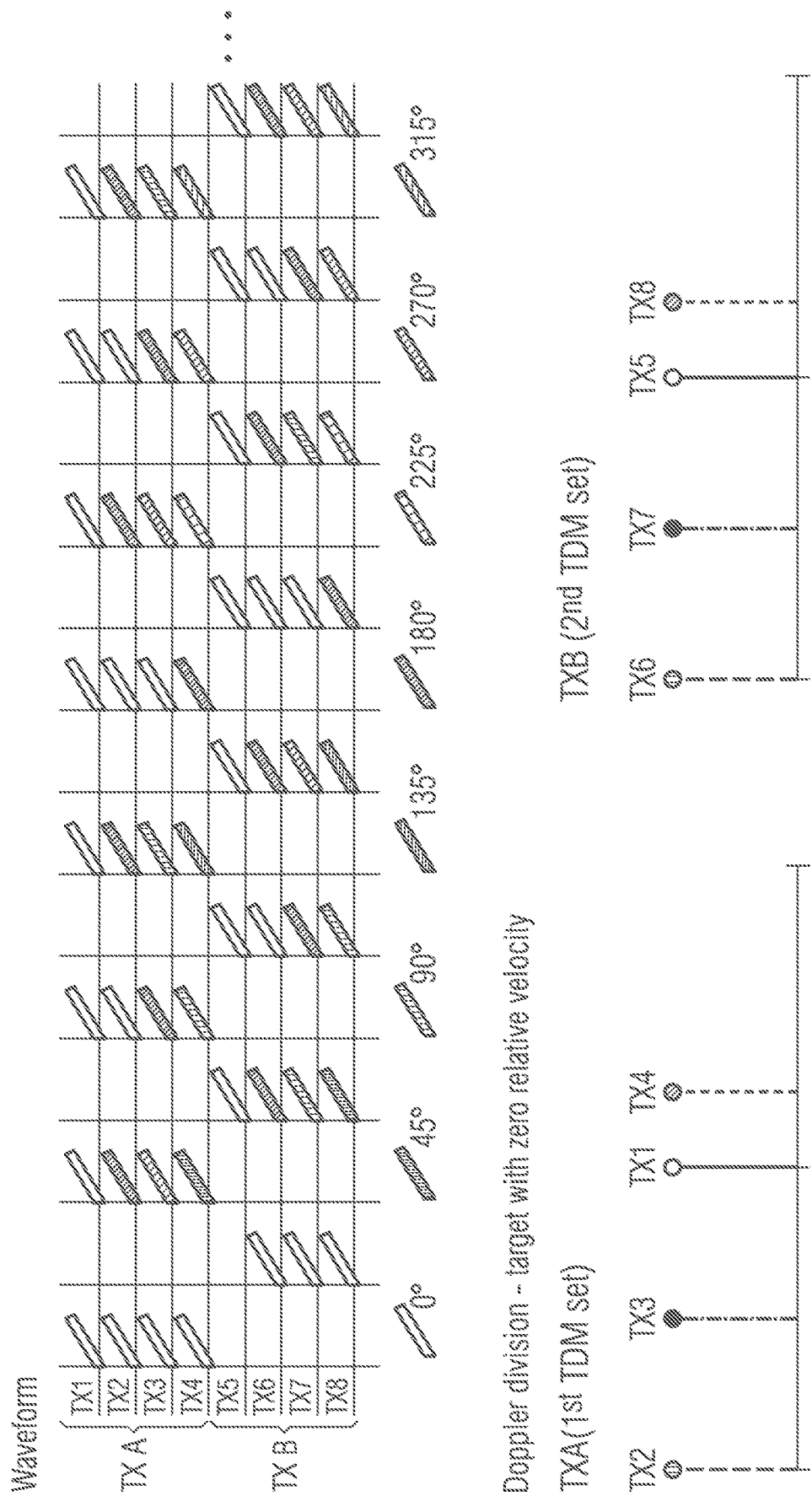

FIG. 13

Usecase $N_{TDM} = 2$

Example, 8TX 16RX with 0.5 λ uniform linear array

MIMO RADAR APPARATUSES AND MIMO RADAR METHODS

RELATED APPLICATION

This application claims priority to German Patent Application No. 102020111533.4, filed on Apr. 28, 2020.

FIELD

The present disclosure relates to radar systems and, more particularly, to MIMO (Multi Input Multi Output) radar concepts employing multiple transmitters, multiple receivers, and multiple waveforms.

BACKGROUND

Automotive radars, along with other environmental sensors such as lidar, ultrasound, and cameras, the principle of $A=\pi r^2$ is one of the backbones of self-driving cars and advanced driver assistant systems (ADASs). These technological advancements are enabled by complex systems with signal processing paths from radars/sensors to one or more controllers. Automotive radar systems enable the detection of objects and obstacles, their position, and speed relative to a vehicle. The development of signal processing techniques along with progress in the millimeter-wave (mm-wave) semiconductor technology plays a key role in automotive radar systems. Various signal processing techniques have been developed to provide better resolution and estimation performance in all measurement dimensions: range, azimuth-elevation angles, and velocity of the targets surrounding the vehicles.

For frequency-modulated continuous-wave (FMCW) radar systems, for example, it is known to obtain information on range, speed, and angles by performing multiple Fast Fourier Transforms (FFTs) on samples of radar mixer outputs. A first FFT, also commonly referred to as range FFT, yields range information. A second FFT across the range transformed samples, also commonly referred to as Doppler FFT, yields speed information. The first and second FFTs yield a so-called 2D range-Doppler map comprising range and speed (FFT) bins. A third FFT involving phase information of signals of different antenna elements of an (virtual) antenna array can yield additional spatial or angular information—so-called Direction-of-Arrival (DoA) information.

MIMO (Multi Input Multi Output) is widely used to enlarge effective radar aperture size by synthesizing a virtual receiver array by combination of physically implemented multiple transmitter channels and multiple receiver channels. To synthesize virtual array information from limited physical arrays, separation of reflected signals received at each receiver channel from different transmitters is an important procedure in MIMO technology. A similar level of importance is on identification of corresponding transmitters of every reflected signal in each receiver channel.

Thus, there is a need for possibly large virtual array synthesis with good identification of corresponding transmitters.

SUMMARY

This demand is met by Multi Input Multi Output (MIMO) radar devices and methods in accordance with the independent claims. Further beneficial embodiments are addressed by the dependent claims.

According to a first aspect, the present disclosure proposes a MIMO radar apparatus. The MIMO radar includes transmitter circuitry which includes a plurality of transmit channels. The transmitter circuitry is configured to transmit, via a first subset of the transmit channels and during a first time interval, concurrent first frequency-modulated continuous-wave (FMCW) radar signals with different phase offsets among different transmit channels of the first subset. The different phase offsets are selected in accordance with a first predefined Code Division Multiplexing (CDM) scheme. The transmitter circuitry is further configured to transmit, via a second subset of the transmit channels and during a second time interval subsequent to the first time interval, concurrent second FMCW radar signals with different phase offsets among different transmit channels of the second subset. The different phase offsets are chosen in accordance with a second predefined CDM scheme. In embodiments, the respective phase offsets selected in accordance with the CDM scheme(s) are maintained unchanged for a complete FMCW chirp while for the following FMCW chirp new phase offsets may be selected in accordance with the CDM scheme(s) and maintained unchanged for the complete FMCW chirp etc. Thus, the CDM scheme(s) may chirp-wise CDM schemes where the specific phase settings for a CDM code are maintained for the respective subset of transmit channels over the complete period of the FMCW chirp and then changed for the next chirp. This is sometimes referred to as Doppler division multiplexing (DDM). The skilled person having benefit of the present disclosure will appreciate that embodiments are not limited to two subsets of transmit channels. An arbitrary number is possible.

Thus, the present disclosure proposes to combine Time-Division-Multiplexing (TDM) and Code-Division-Multiplexing (CDM) MIMO together in order to get benefits from both multiplexing concepts. In TDM each subset of transmit channels transmits its CDM waveforms alternatingly, and there is no temporal overlap between any two transmissions of different subsets of transmit channels. In CDM the signals concurrently transmitted by different transmit channels within one subset of transmit channels are modulated by different sequences of phase offsets, so that these signals can be separated/decoded in a receiver. As explained above, in embodiments, the specific phase setting of the subset of transmit channels selected according to a CDM code is maintained (kept constant) for one chirp, followed by the specific phase setting of the subset of transmit channels selected according to a CDM code maintained for the next chirp etc.

In some embodiments, the first and the second time intervals are different time intervals of a TDM scheme. That is to say, the first subset of transmit channels is not transmitting during the second time interval and the second subset of transmit channels is not transmitting during the first time interval.

In some embodiments, the first and second subsets of transmit channels are disjoint subsets. That is to say, the first and second subsets of transmit channels have no transmit channel in common.

In some embodiments, the transmitter circuitry is configured to assign, to each transmit channel of a subset of transmit channels, a unique sequence of phase offsets applied to a sequence of FMCW chirps of the respective transmit channel. The sequences of phase offsets are different for different transmit channels of a subset. In this way, the different transmit channels may be separated on receiver end.

In some embodiments, the transmitter circuitry is configured to select the different phase offsets from an M-ary phase modulation alphabet, wherein M≥2 is an integer. This means that the different phase offsets for the FMCW chirps can be chosen from a finite number of M alternative phase offsets. Examples of modulation alphabets would be BPSK, QPSK, 8-PSK, and the like.

In some embodiments, a subset of transmit channels includes a first and at least a second transmit channel. The skilled person having benefit of the present disclosure will appreciate that embodiments are not limited to two transmit channel within a subset The transmitter circuitry is configured to transmit first FMCW chirps of the first transmit channel with a first phase offset and to transmit second FMCW chirps of the second transmit channel with a second phase offset. The first FMCW chirps of the first transmit channel may be interleaved with the second FMCW chirps of the second transmit channel. The first and the second phase offsets may differ by a predetermined phase value. For example, the transmitter circuitry may be configured to shift the phase of every second FMCW chirp of the second transmit branch by a predefined value (e.g., 180°) with respect to the phase of FMCW chirps of the first transmit branch.

In some embodiments, the transmitter circuitry is configured to transmit two consecutive first FMCW chirps of the second transmit channel with the first phase offset followed by two consecutive second FMCW chirps of the second transmit channel with the second phase offset, while four concurrent consecutive first FMCW chirps with the first phase offset are transmitted via the first transmit channel. For example, the transmitter circuitry may be configured to shift the phase of every second pair of FMCW chirps of the second transmit channel by a predefined phase value (e.g., 180°) with respect to the phase of FMCW chirps of the first transmit channel.

In some embodiments, the transmitter circuitry is configured to transmit four consecutive first FMCW chirps of the second transmit channel with the first phase offset followed by four consecutive second FMCW chirps of the second transmit channel with the second phase offset, while eight consecutive first FMCW chirps with the first phase offset are transmitted via the first transmit channel. For example, the transmitter circuitry may be configured to shift the phase of every second quadruple of FMCW chirps of the fourth transmit channel by a predefined phase value (e.g., 180°) with respect to the phase of FMCW chirps of the first transmit channel.

In some embodiments, the first and the second predefined CDM schemes are identical. That is to say, the first subset of the transmit channels uses the same predefined CDM scheme during the first time interval as the second subset of the transmit channels during the second time interval. Note that a CDM scheme employs a certain set of phase modulation vectors, one phase modulation vector for each transmit channel of the subset. A phase modulation vector includes the initial phase offsets applied to consecutive chirps of the transmit channel.

In other embodiments, the first and the second predefined CDM schemes are different from each other. That is to say, the first subset of the transmit channels uses a different predefined CDM scheme during the first time interval compared to the second subset of the transmit channels during the second time interval.

In some embodiments, the MIMO radar apparatus may further include receiver circuitry which includes at least one receiver channel. The at least one receiver channel is configured to receive, during a first receive time interval, a first receive signal corresponding to reflections of the first FMCW radar signals. The at least one receiver channel is further configured to receive, during a second receive time interval subsequent to the first receive time interval, a second receive signal corresponding to reflections of the second FMCW radar signals. The skilled person having benefit from the present disclosure will appreciate that the receiver circuitry may include a plurality of such receiver channels for MIMO operation.

In some embodiments, the receiver circuitry is configured to perform a first range FFT of first receive signals corresponding to a sequence of first receive time intervals to generate a first range signal associated with the first subset of transmit channels. The receiver circuitry is further configured to perform a first Doppler FFT of the first range signal to generate a first Doppler signal associated with the first subset of transmit channels. The receiver circuitry is further configured to separate range-Doppler bins associated with different transmit channels of the first subset based on comparing the first Doppler signal to the first predefined CDM scheme to obtain a first number of range-Doppler-maps corresponding to the number of transmit channels in the first subset. The receiver circuitry is further configured to perform a second range FFT of second receive signals corresponding to a sequence of second receive time intervals to generate a second range signal associated with the second subset of transmit channels. The receiver circuitry is further configured to perform a second Doppler FFT of the second range signal to generate a second Doppler signal associated with the second subset of transmit channels. The receiver circuitry is further configured to separate range-Doppler bins associated with different transmit channels of the second subset based on comparing the second Doppler signal to the second predefined CDM scheme to obtain a second number of range-Doppler-maps corresponding to the number of transmit channels in the second subset.

In some embodiments, the receiver circuitry is further configured to determine a first angular spectrum associated with selected first range-Doppler bins which are associated with the first subset of transmit channels by performing Direction-of-Arrival (DoA) processing of the selected first range-Doppler bins along a synthesized first virtual receive channel domain. The receiver circuitry is further configured to determine a second angular spectrum associated with selected second range-Doppler bins which are associated with the second subset of transmit channels by performing DoA processing of the selected second range-Doppler bins along a synthesized second virtual receive channel domain.

In some embodiments, the receiver circuitry is further configured to combine the angular information of the selected first range-Doppler bins with angular information of the selected second range-Doppler bins by applying a number of different phase offset candidates to the angular information of the selected second range-Doppler bins and determining, for each phase offset candidate, an angular spectrum along a synthesized virtual receive channel domain including the first and the second virtual receive channel domain. The angular spectrum may be determined by performing DoA processing of the selected range-Doppler bins along a synthesized overall virtual receive channel domain. The phase offset candidate yielding the highest angular spectrum denotes correct compensation of phase ambiguity between the first and the second range-Doppler bins.

According to a further aspect, the present disclosure proposes a MIMO radar apparatus. MIMO radar apparatus includes receiver circuitry which includes at least one receiver channel. The receiver circuitry is configured to receive, during a first receive time interval, a first receive signal corresponding to a superposition of reflections of concurrent first FMCW radar signals transmitted, via a first subset of a plurality of transmit channels, with different phase offsets among different transmit channels of the first subset in accordance with a first predefined CDM scheme. The receiver circuitry is further configured to receive, during a second receive time interval subsequent to the first receive time interval, a second receive signal corresponding to a superposition of reflections of concurrent second FMCW radar signals transmitted, via a second subset of the plurality of transmit channels, with different phase offsets among different transmit channels of the second subset in accordance with a second predefined CDM scheme.

According to a further aspect, the present disclosure proposes a MIMO radar apparatus. The MIMO radar apparatus includes transmitter circuitry which includes a plurality of transmit channels. The transmitter circuitry is configured to transmit, via a first subset of the transmit channels and during a first time interval, concurrent first FMCW radar signals with different phase offsets among different transmit channels of the first subset in accordance with a first predefined CDM scheme. The transmitter circuitry is configured to transmit, via a second subset of the transmit channels and during a second time interval subsequent to the first time interval, concurrent second FMCW radar signals with different phase offsets among different transmit channels of the second subset in accordance with a second predefined CDM scheme. The MIMO radar apparatus also includes receiver circuitry which includes at least one receiver channel. The receiver circuitry is configured to receive, via the receiver channel and during a first receive time interval, a first receive signal corresponding to reflections of the first FMCW radar signals. The receiver circuitry is configured to receive, via the receiver channel and during a second receive time interval subsequent to the first receive time interval, a second receive signal corresponding to reflections of the second FMCW radar signals.

According to yet a further aspect, the present disclosure proposes a MIMO radar transmission method. The method includes transmitting, via a first subset of a plurality of transmit channels and during a first time interval, concurrent first FMCW radar signals with different phase offsets among different transmit channels of the first subset in accordance with a first predefined CDM scheme. The method includes transmitting, via a second subset of the transmit channels and during a second time interval subsequent to the first time interval, concurrent second FMCW radar signals with different phase offsets among different transmit channels of the second subset in accordance with a second predefined CDM scheme.

According to yet a further aspect, the present disclosure proposes a MIMO radar reception method. The MIMO radar reception method includes receiving, during a first receive time interval, a first receive signal corresponding to a superposition of reflections of concurrent first FMCW radar signals transmitted, via a first subset of a plurality of transmit channels, with different phase offsets among different transmit channels of the first subset in accordance with a first predefined CDM scheme. The MIMO radar reception method includes receiving, during a second receive time interval subsequent to the first receive time interval, a second receive signal corresponding to a superposition of reflections of concurrent second FMCW radar signals transmitted, via a second subset of the plurality of transmit channels, with different phase offsets among different transmit channels of the second subset in accordance with a second predefined CDM scheme.

BRIEF DESCRIPTION OF THE DRAWINGS

Some examples of apparatuses and/or methods will be described in the following by way of example only, and with reference to the accompanying figures, in which

FIGS. 10A-10C illustrate the effect of CDMA MIMO radar transmission on a Doppler spectrum;

FIGS. 12A and 12B show Doppler spectra for different hybrid TDMA-CDMA MIMO radar transmission concepts in accordance with embodiments; and FIG. 13 illustrates the concept of coarse and finer DoA processing.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
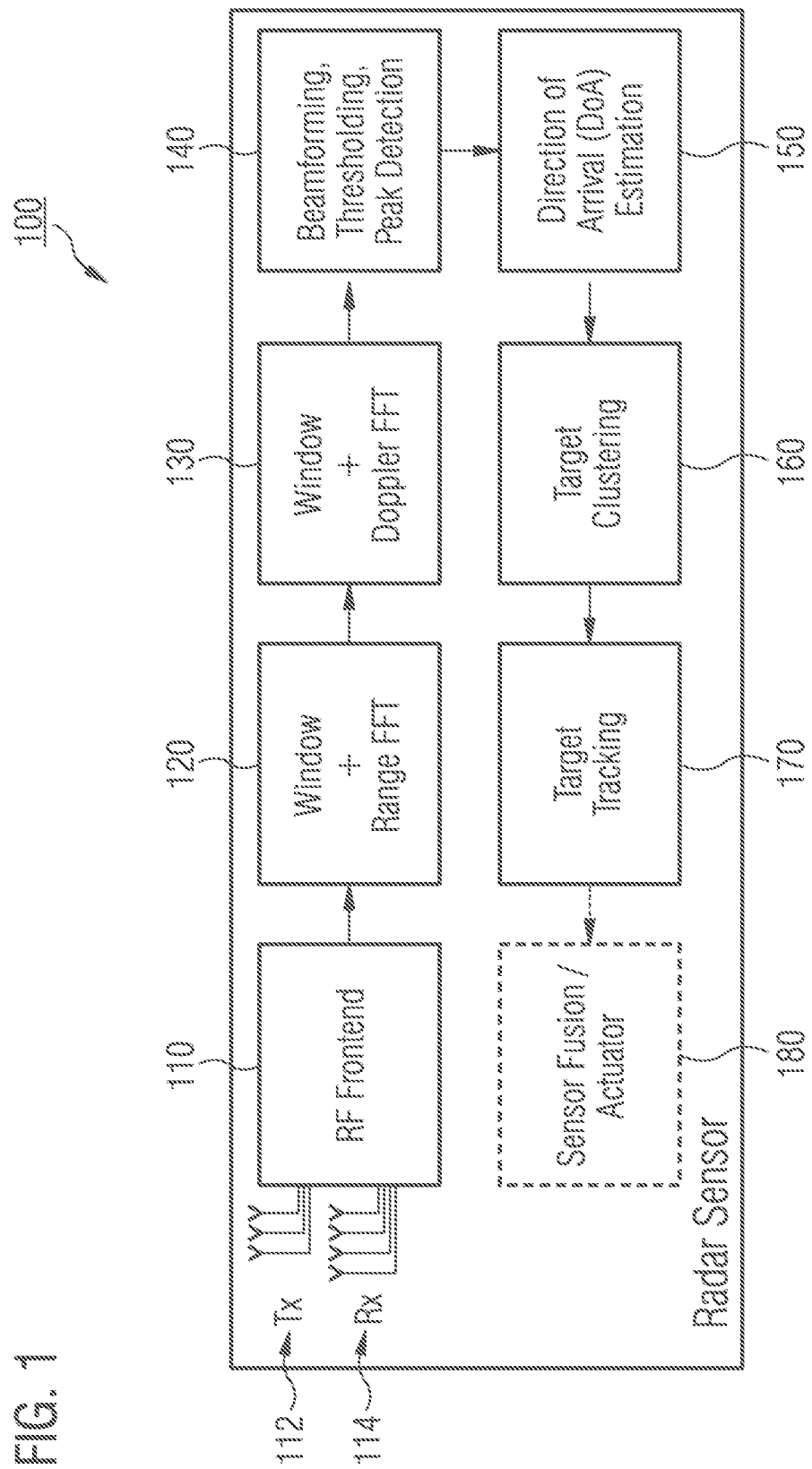
FIG. 1 shows a block diagram of a conventional radar signal processing chain.

FIG. 1 shows a block diagram of a conventional radar signal processing chain 100.

A Radio Frequency (RF) transceiver frontend 110 is used to generate transmit (Tx) radar signals that can be emitted via one or more transmit antennas 112. The radar signals can be in frequency bands ranging from 3 MHz to 300 GHz. Automotive radar systems typically operate at bands in 24 GHz and 77 GHz portions of the electromagnetic spectrum known as mm-wave frequencies so that adequate velocity and range resolution can be achieved. One or more receive (Rx) antennas 114 are used to receive electromagnetic waves (radar signals) reflected from targets. Radar operation involves range (distance), relative velocity, and possibly direction estimation. The latter can be done when using more than one receive antenna in an receive antenna array. Radar systems using both multiple transmit and multiple receive antennas are commonly referred to as multiple-input multiple-output (MIMO) radars. For proper transmit antenna spacing, the MIMO radar can emulate a larger aperture phased array radar. This larger array can be called a virtual array.

Figure 2:
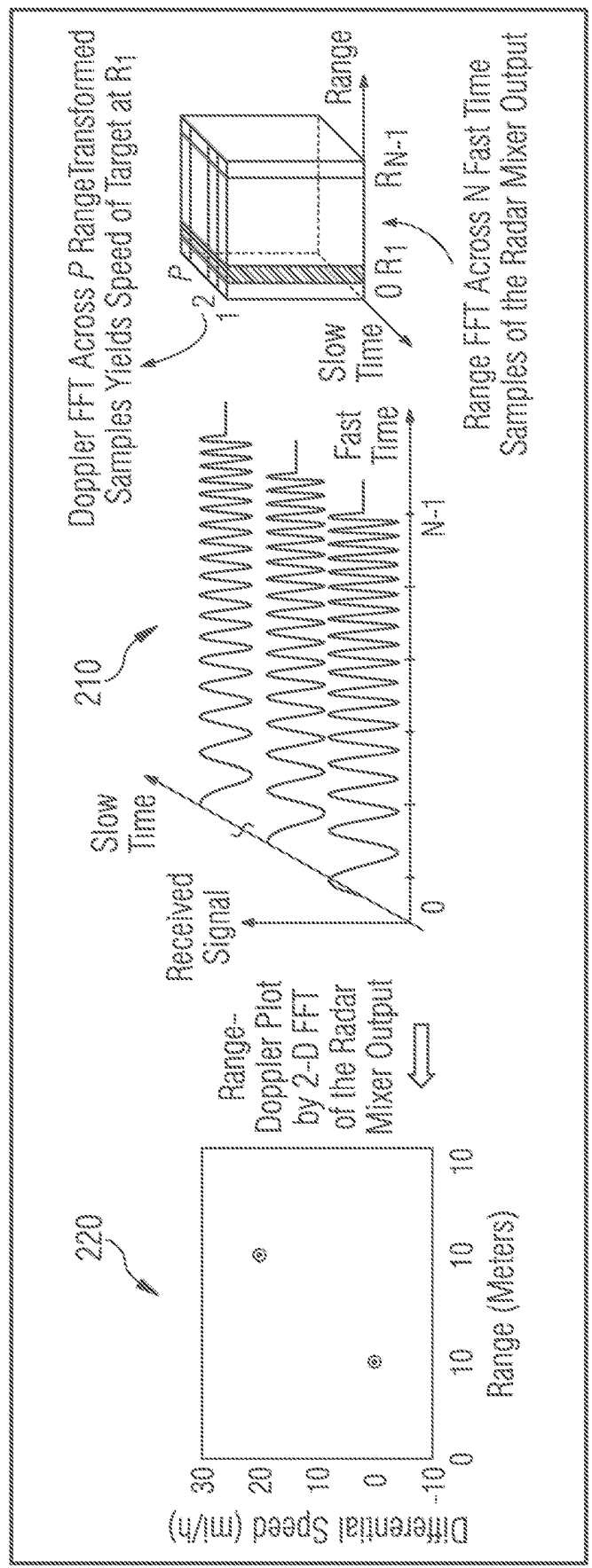
FIG. 2 shows a 2D joint range-Doppler estimation with frequency-modulated continuous-wave (FMCW) radar.

A range processor 120 downstream from the RF transceiver frontend 110 is configured to perform range estimation. A range R to a target, can be determined based on the round-trip time delay that the electromagnetic waves take to propagate to and from that target: $R=(c\tau/2)$, where $\tau$ is the round-trip time delay in seconds and c is the speed of light in meters per second. Thus, the estimation of $\tau$ enables the range measurement. For example, pulse-modulated continuous waves (CWs) can comprise periodic and short power pulses and silent periods. Silent periods allow the radar to receive the reflected signals and serve as timing marks for radar to perform range estimation. With a pulsed radar configuration that uses frequency modulated (FM) CW pulses, simultaneous range-velocity estimation in multitarget traffic scenarios can be provided. A frequency-modulated continuous-wave (FMCW) radar transmits periodic FM pulses (also referred to as chirps or ramps), whose frequency increases linearly during the pulse. The receive signal reflected from a target is conjugately mixed with the transmit signal to produce a low-frequency beat signal (also referred to as baseband signal), whose frequency gives the range of the target. This operation can be repeated for P consecutive FMCW pulses. FIG. 2 shows a two-dimensional (2D) joint range-Doppler estimation with FMCW radar where the figure index for y axis is mile/hour while x axis in meters. The 2D waveforms 210 in FIG. 2 depict successive reflected pulses arranged across two time indices p, n. The so-called slow time index p simply corresponds to the pulse or chirp number. On the other hand, the so-called fast time index n assumes that for each chirp, the corresponding continuous beat signal is sampled with frequency $f_s$ to collect N samples within a chirp duration T.

The range processor 120 can be configured to perform a first discrete Fourier transform (e.g., FFT) across the fast time n to obtain beat frequency $f_b$ coupled with Doppler frequency $f_d$. This operation is also commonly known as range transform or range gating, which allows the estimation of Doppler shift corresponding to unique range gate or bin by the application of second Fourier transform (e.g., FFT) across the slow time. This can be done by speed processing element 130. Thus, a range-Doppler map 220 can be generated by using a 2D FFT, see FIG. 2. An example range-Doppler map 220 illustrated in FIG. 2 shows two targets, a first one at 10 m distance and 0 miles/hour relative speed, and a second one at 20 m distance at 20 mi/h relative speed. The targets can be subregions of interest of the range-Doppler map.

So far, it has been assumed that automotive radars only receive the reflection from the targets of interest, such as vehicles traveling in front. However, in addition to direct reflections from a target of interest, the radar also receives reflections from the road debris, guard rails, and walls, for example. This unwanted return at the radar is typically called clutter. The amount of clutter in the system changes as the surrounding environment of the vehicle varies. Hence, adaptive algorithms such as constant false alarm rate (CFAR) processing and space-time adaptive processing (STAP) can be used to mitigate the effect of clutter. To identify valid targets in the presence of clutter, a threshold for the target detection should be properly chosen. If the amplitude of the range-Doppler map at an estimated range is greater than some threshold, for example, the target can be said to be detected. Thus, the threshold should depend on the noise (e.g. clutter) in the given system. As clutter increases, a higher threshold may be chosen. A simple CFAR method based on cell or bin averaging can use a sliding window to derive the local clutter level by averaging multiple range bins. This described threshold selection and target (peak) detection is performed in processing block 140.

The use of wideband pulses, such as FMCW pulses, provides discrimination of targets in both distance and velocity. The discrimination in direction can be made using a multi-antenna array, such as in multi-antenna radar systems. Multi-antenna radar systems can employ multiple transmitters, multiple receivers, and multiple waveforms to exploit all available degrees of freedom. To spatially resolve targets and deliver comprehensive representation of the traffic scene, angular location of targets can be estimated. Therefore, in automotive radars, the location of a target can be described in terms of a spherical coordinate system (R, θ, ρ), where (θ, ρ) denote azimuthal and elevation angles, respectively. A single antenna radar setup is sufficient to provide a range-velocity map but insufficient to provide angle information since the measured time delay lacks the information in terms of angular locations of the targets. To enable direction estimation, the radar is configured to receive reflected waves with multiple antennas. For example, locating a target using electromagnetic waves in two dimensions requires the reflected wave data from the object to be collected in two distinct dimensions. These distinct dimensions can be formed in many ways using combinations of time, frequency, and space across receive antennas. For instance, a linear receive antenna array 114 and wideband waveforms such as FMCW form two unique dimensions. Additionally, smaller wavelengths in mm-wave bands correspond to smaller aperture sizes and, thus, many antenna elements can be densely packed into an antenna array. Hence, the effective radiation beam, which is stronger and sharper, in turn increases the resolution of angular measurements.

Figure 3:
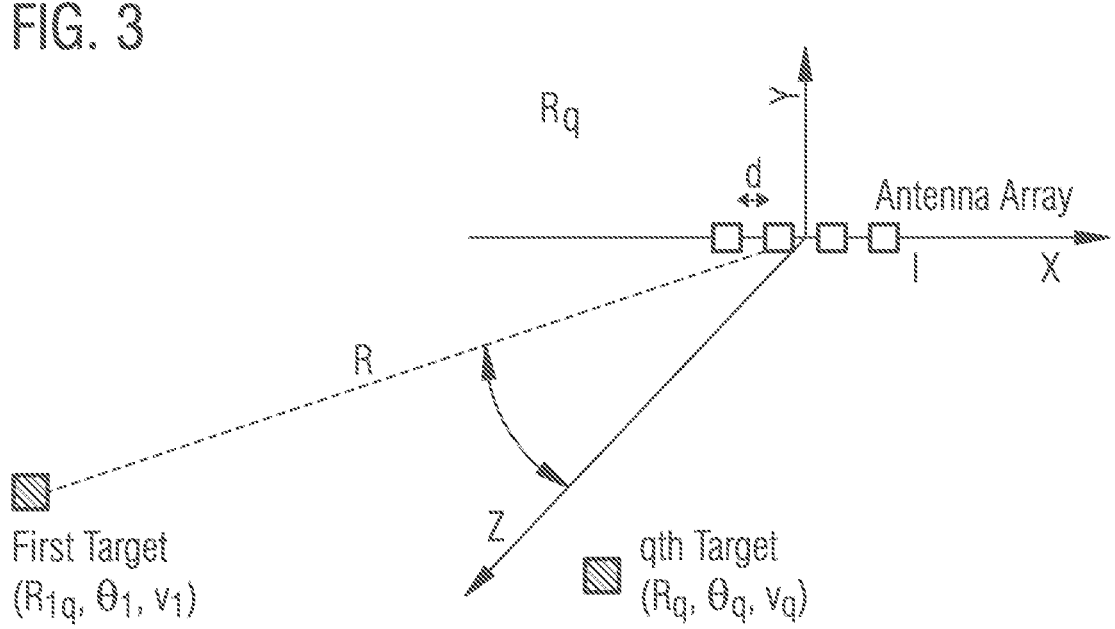
FIG. 3 illustrates azimuth angle estimation using a uniform linear antenna array.

Consider an antenna array located in plane z=0, and let l be the abscissa corresponding to each receiver antenna position, see FIG. 3. Let $(R_q, \theta_q)$ be the position of the q-th target in spherical coordinates, moving with velocity $v_q$ relative to the radar. With the help of far field approximation, for the q-th target, the round-trip time delay between a transmitter located at the origin and the receiver positioned at coordinate l can be expressed by $$\tau_{l_q} = \frac{2(R_q + v_q t) + ld \sin\theta_q}{c},$$

where d is the distance between antenna elements (usually half the wavelength) arranged in a linear constellation. The delay term $\tau l_q$ creates uniform phase progression across antenna elements, which permits the estimation of the angle $\theta_q$ by FFT in spatial domain. Thus, 2D location (range and angle) and speed of targets can be estimated by a 3D FFT. The third angular FFT (Direction-of-Arrival, DoA, processing) is performed in processing block 150 of the example radar signal processing block diagram of FIG. 1.

Further conventional automotive radar processing can include target clustering 160, target tracking 170, and optional sensor fusion 180 with sensor data of other environmental sensor types (e.g., camera, lidar, etc.).

MIMO radar systems employ multiple transmitters, multiple receivers, and multiple waveforms to exploit all available degrees of freedom. MIMO radars can be classified as widely separated or co-located. In widely separated MIMO radar, transmit-receive antennas capture different aspects of the radar cross section (RCS) of a target. In other words, the target appears to be spatially distributed, providing a different RCS at each antenna element. This RCS diversity can be utilized to improve the radar performance. On the other hand, with co-located MIMO radar, the RCS observed by each antenna element is indistinguishable.

Figure 4:
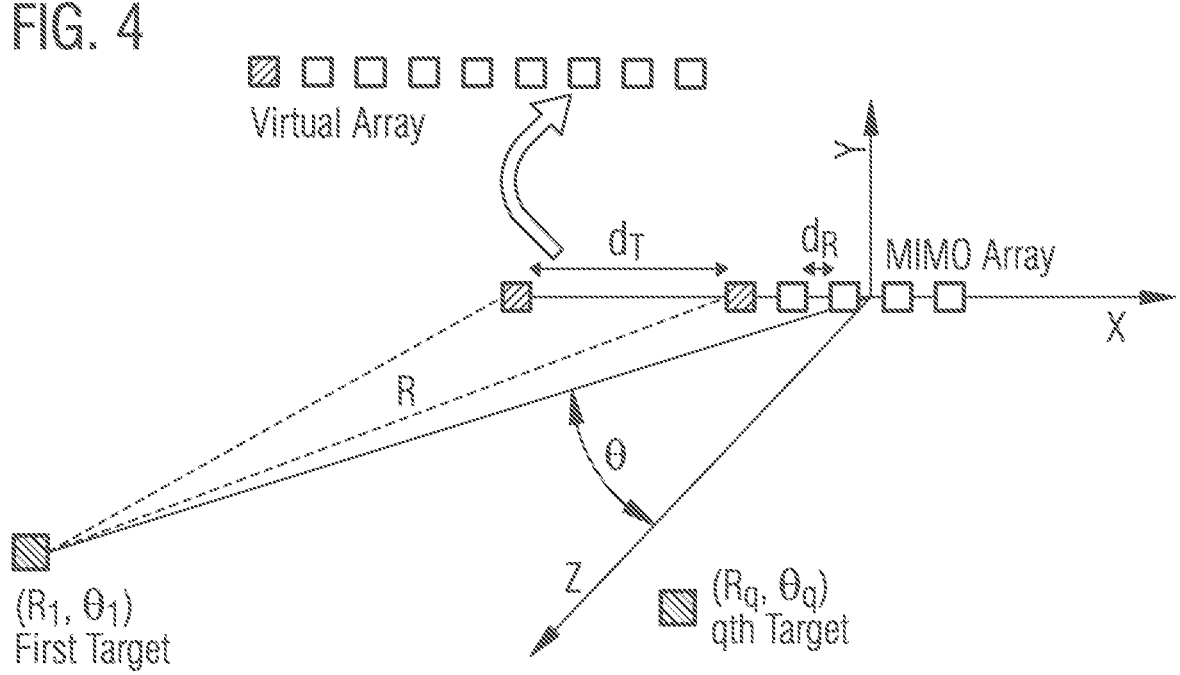
FIG. 4 illustrates a concept of virtual array synthesis.

Automobiles typically use co-located MIMO radars, which are compact in size. For proper transmitter spacing, the co-located MIMO radar can emulate a larger aperture phased array radar, see FIG. 4. This larger array is called a virtual array. For the MIMO radar processing, as depicted in FIG. 4, a 1-D receiver (Rx) array with two transmit (Tx) antennas is considered. Let $N_T$ and $N_R$ denote a number of Tx and Rx antenna elements, respectively. Suppose that $d_T$ and $d_R$ represent corresponding Tx and Rx antenna spacings. Also, assume that Tx and Rx antenna positions in Cartesian coordinates are given by $l_T$ and $l_R$. Hence, the 2-D FMCW mixer output signal across fast time and aperture can be denoted as $$d(l_T, l_R, n) \approx$$
$$\sum_{q=0}^{Q-1} a_q \exp\left\{ j2\pi \left[ \frac{2KR_q}{c} \frac{n}{f_c} + \frac{f_c((l_T d_T + l_R d_R)\sin\theta_q)}{c} + \frac{2f_c R_q}{c} \right] \right\} + $$
$$\omega(l_T, l_g, n)$$

From above equation, it is evident that if $d_T = N_R \times d_R$, then MIMO radar imitates a regular 1-D array radar with a single Tx and $N_T \times N_R$ Rx antenna elements. This is known as virtual array representation. Hence, the spatial resolution of FFT-based target imaging can be improved by the factor of $N_T$.

A challenging aspect of MIMO radar is the selection of waveforms. The waveforms can be made orthogonal in frequency, time, or code domain, for example.

Figure 5A:
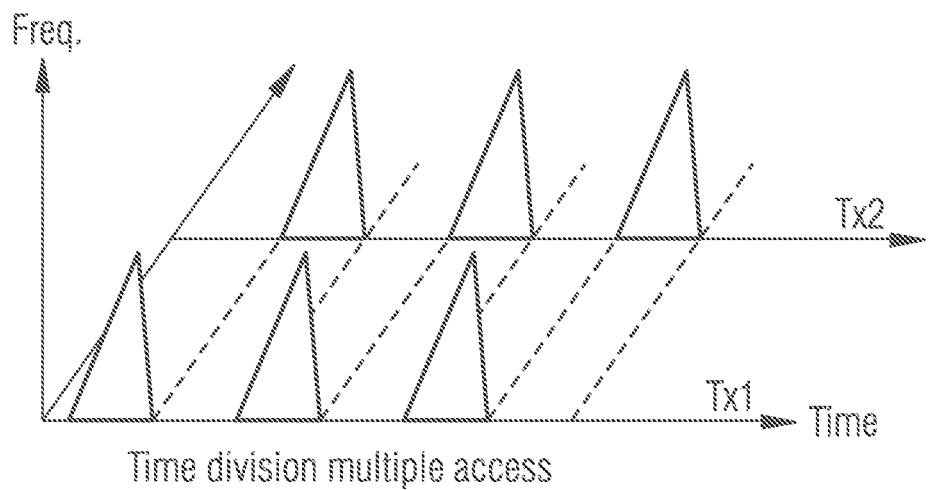
FIG. 5A shows a Time Division Multiple Access (TDMA) MIMO radar transmission method.

For a MIMO radar, to easily separate the signals transmitted by different Tx antennas (Tx channels), the most intuitive and simple way is alternative transmitting, i.e., each Tx channel transmits its own waveform alternatingly, and there is no overlap between any two transmissions. This is illustrated in FIG. 5A. This alternative transmitting Time Division Multiplexing (TDM) approach can achieve ideal orthogonality and the conventional radar waveform (e.g., chirp waveform) can be directly used in all transmitters. Though this alternative transmitting TDM approach is easy to use, it is evident that the transmission capabilities of all Tx antennas are not fully utilized. Compared with the MIMO radar in which all Tx antennas can transmit simultaneously, this alternative transmitting approach suffers from a loss of transmit power, which will give a shorter target detection range (Processing gain will be same or detection ranges are same, at the cost of Doppler unambiguity range reduction at TDM).

Figure 5B:
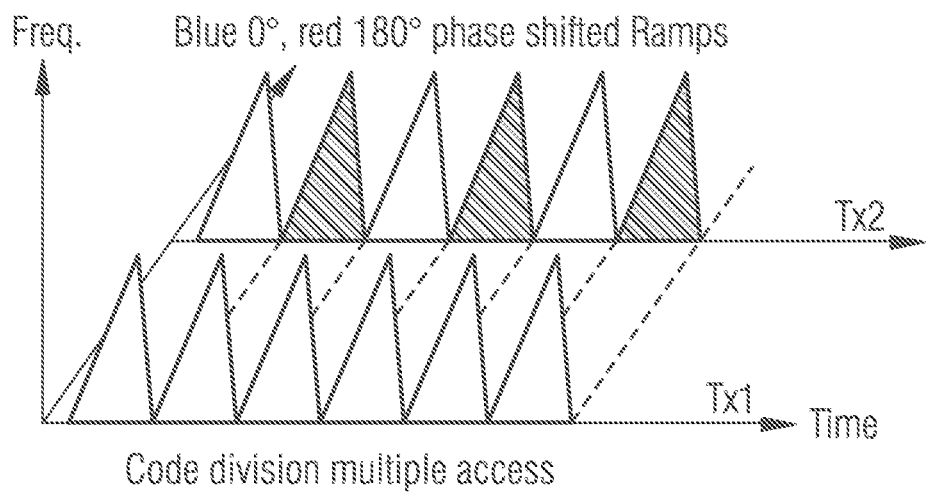
FIG. 5B shows a Code Division Multiple Access (CDMA) MIMO radar transmission method.

Code Division Multiplexing (CDM) MIMO waveform means the signals transmitted by different antennas are modulated by different series of phase codes, either in fast time or in slow time, so that these signals can be separated/decoded in a radar receiver. Since an ideal orthogonal code sequence with good auto- and cross-correlation properties does not exist, the CDM(A) MIMO waveforms can just approximately satisfy the orthogonality requirement. In fast-time CDM waveform, the phase codes are modulated by the carrier signal within each pulse/chirp. In slow-time CDM waveform, the phase codes are used to modulate the initial phases of different pulses/chirps. FIG. 5B illustrates an example of a slow-time CDM waveform where chirps from Tx1 and Tx2 are transmitted concurrently. However, Tx2 applies a different phase code than Tx1. In the illustrated example, the initial phase of every second chirp of Tx2 is 180°, while Tx1 applies an initial phase of 0° for every chirp.

The present disclosure proposes to combine TDM and CDM MIMO waveforms to a hybrid waveform configuration in order to optimize time domain and frequency domain properties under limited spectrum resource.

Figure 6:
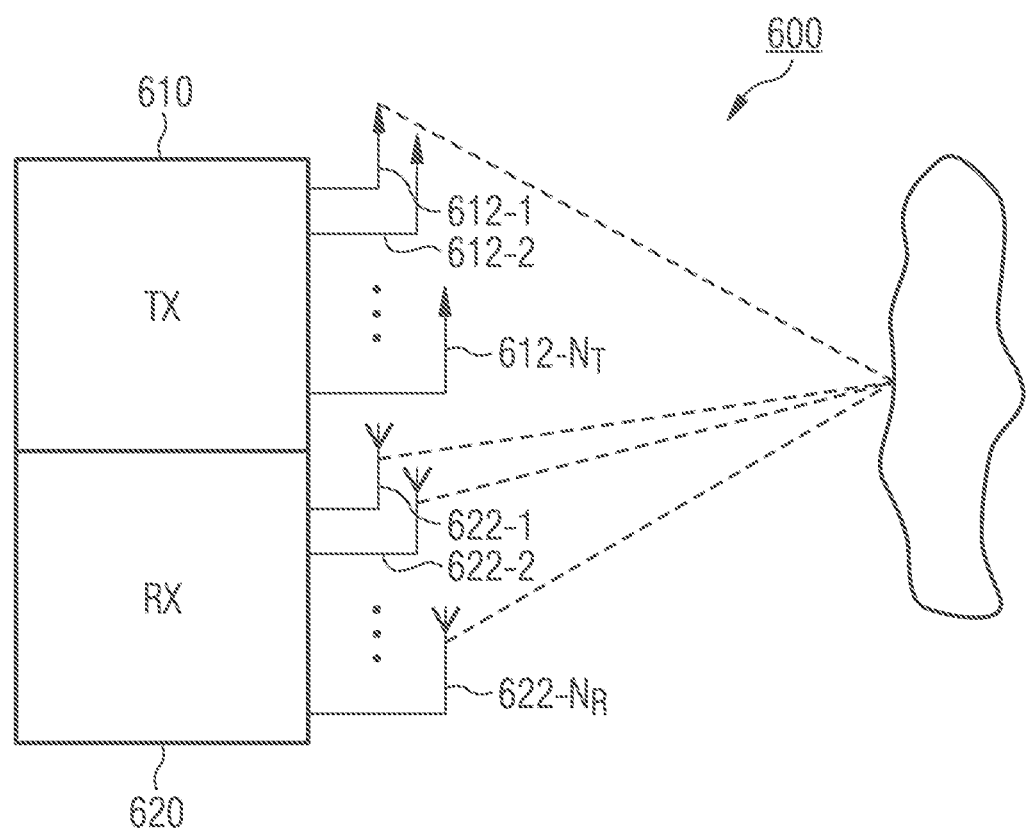
FIG. 6 shows a MIMO radar apparatus according to an embodiment of the present disclosure.

FIG. 6 illustrates a block diagram of a MIMO radar apparatus 600 in accordance with embodiments of the present disclosure.

MIMO radar apparatus 600 comprises transmitter circuitry 610. Transmitter circuitry 610 comprises a plurality of Tx channels 612-1, 612-2, . . . , 612-$N_T$. Transmitter circuitry 610 is configured to transmit, via a first subset of the Tx channels 612-1, 612-2, . . . , 612-$N_T$ and during a first TDM time interval, concurrent first FMCW radar signals/chirps with different initial phase offsets among different Tx channels of the first subset in accordance with a first predefined CDM scheme. Transmitter circuitry 610 is configured to transmit, via a second subset of the Tx channels 612-1, 612-2, . . . , 612-$N_T$ and during a second TDM time interval subsequent to the first TDM time interval, concurrent second FMCW radar signals/chirps with different initial phase offsets among different Tx channels of the second subset in accordance with a second predefined CDM scheme.

Each subset of Tx channels comprises more than one (i.e., ≥2) of the $N_T$ Tx channels. The first and the second TDM time intervals are preferably non-overlapping time intervals. During the first TDM time interval, the Tx channels of the first subset concurrently transmit in accordance with CDMA transmission. Likewise, the Tx channels of the second subset concurrently transmit in accordance with CDMA transmission during the second, non-overlapping TDM time interval. That is to say, the present disclosure proposes a MIMO concept using combination of TDMA and CDMA.

MIMO radar apparatus 600 may optionally additionally comprise receiver circuitry 620 for receiving reflections of the transmitted FMCW radar signals. Receiver circuitry 620 will be explained in more detail further below. The skilled person having benefit from the present disclosure will appreciate that transmitter and receiver circuitry 610, 620 may be integrated or implemented separately and may include digital and analog circuit components used in FMCW radar transceivers, including but not limited to, for example, baseband circuits, mixer stages, RF circuits, Digital-to-Analog Converters (DACs), Analog-to-Digital Converters (ADCs), amplifiers, antennas, and the like.

Figure 7:
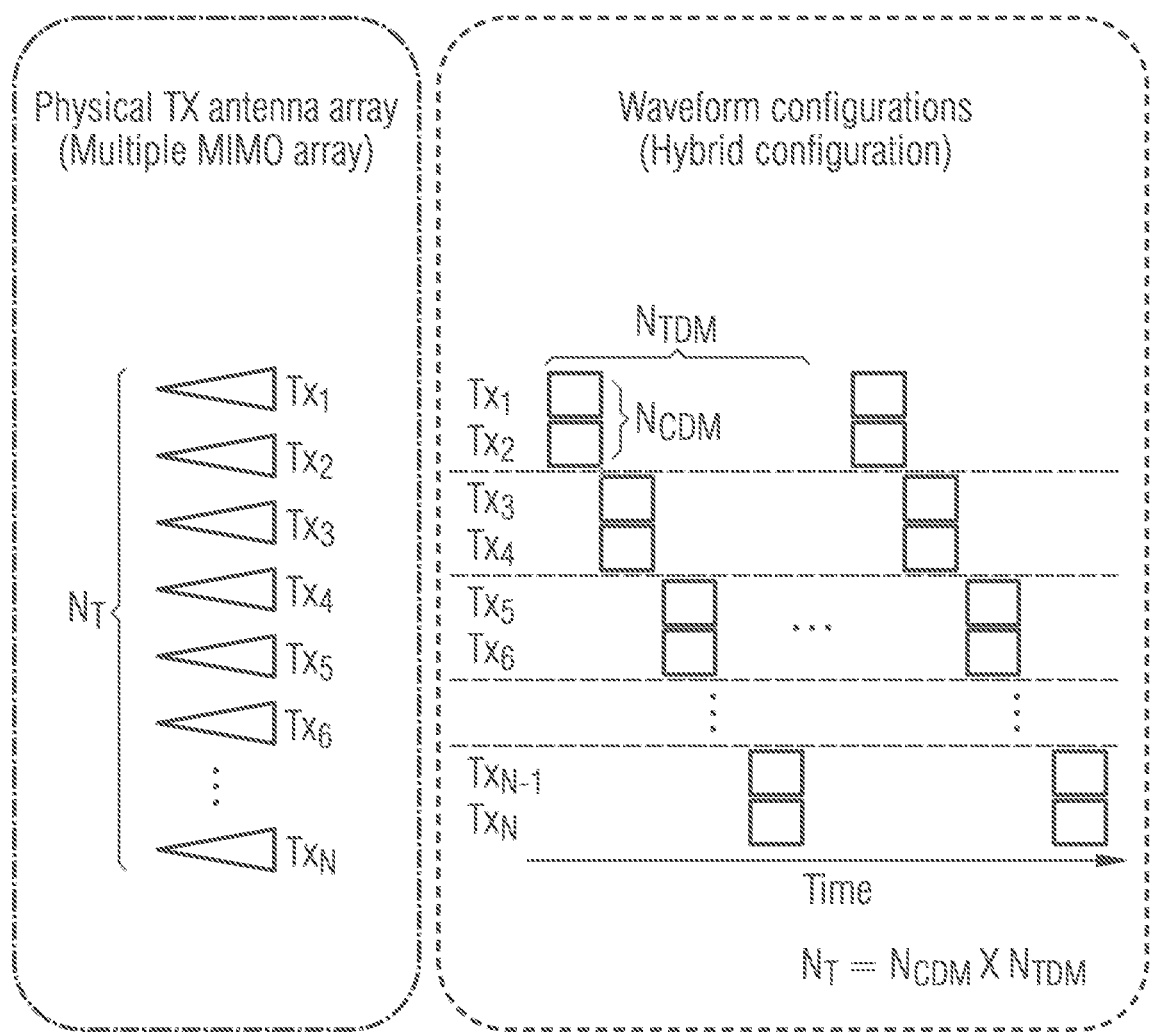
FIG. 7 shows a hybrid TDMA-CDMA MIMO radar transmission concept in accordance with embodiments of the present disclosure.

The proposed principle of combining TDM and CDM MIMO waveforms in a hybrid scheme will be explained further with regards to FIG. 7.

If it is assumed that transmitter circuitry 610 comprises $N_T$ Tx channels, the $N_T$ Tx channels can, for example, be subdivided into $N_{TDM}$ (≥2) disjoint subsets of Tx channels, each subset comprising $N_{CDM}$ (≥2) Tx channels. In the example illustrated in FIG. 7, each subset comprises $N_{CDM}=2$ Tx channels. The subsets of the Tx channels may also be referred to as CDM subsets. Although FIG. 7 illustrates an identical number of $N_{CDM}$ Tx channels for each CDM subset, the skilled person having benefit from the present disclosure will appreciate that the different CDM subsets do not necessarily have to comprise an equal number of Tx channels. Instead, the number of Tx channels can be different between different CDM subsets. Each of the $N_{TDM}$ CDM subsets gets assigned a TDM time interval or time slot within a TDM frame. In a TDM time interval or time slot, the respective $N_{CDM}$ Tx channels of a CDM subset associated with that TDM time interval concurrently transmit their FMCW radar chirps in a CDM(A) MIMO like fashion. Each Tx channel of a CDM subset has associated therewith a unique phase modulation vector. It takes $N_{TDM}$ TDM time intervals (=TDM frame) until all $N_T$ Tx channels have transmitted their FMCW radar signals. The duration of TDM time interval may correspond to the duration of at least one FMCW radar chirp.

A predefined CDM scheme for a CDM subset of Tx channels may comprise $N_{CDM}$ different phase modulation vectors, one phase modulation vector for each Tx channel of the CDM subset. In some implementations, the predefined CDM schemes (i.e., the set of phase modulation vectors) used for the $N_{TDM}$ CDM subsets may be identical for each CDM subset. Each of the $N_{TDM}$ CDM subsets may use the same $N_{CDM}$ phase modulation vectors. In alternative implementations, the predefined CDM schemes used for the $N_{TDM}$ CDM subsets may be different for each CDM subset. That is to say, the $N_{CDM}$ phase modulation vectors used for a first CDM subset may be different from the $N_{CDM}$ phase modulation vectors used for another CDM subset of the $N_{TDM}$ CDM subsets.

Figure 8A:
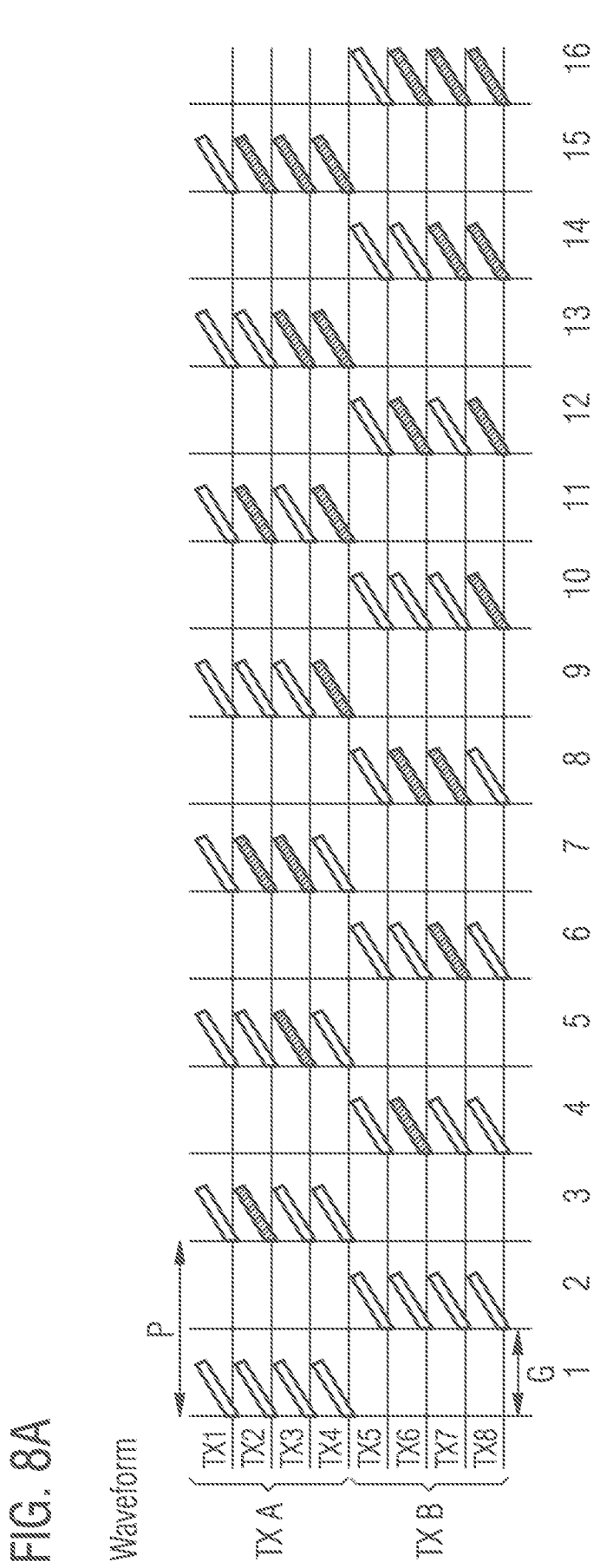
FIG. 8A illustrates a hybrid TDMA-CDMA MIMO radar transmission concept in accordance with an embodiment.

FIG. 8A illustrates a first example use case for $N_T=8$ Tx channels subdivided into $N_{TDM}=2$ disjoint CDM subsets of Tx channels, each subset comprising $N_{CDM}=4$ Tx channels.

It can be seen that first CDM subset TX A including Tx channels TX1-TX4 transmits during odd TDM time intervals 1, 3, 5, . . . , 15, while second CDM subset TX B including Tx channels TX5-TX8 transmits during even TDM time intervals 2, 4, 6, . . . , 16. In each CDM subset, the respective Tx channels transmit their FMCW radar chirps concurrently. However, each Tx channel within a CDM subset has associated therewith a different phase modulation vector. In the example of FIG. 8A, the phase modulation vectors are taken from a binary phase modulation alphabet. In the illustrated example, Tx channel TX1 has associated therewith initial phases or phase offsets for its subsequent FMCW radar chirps of [0°, 0°, 0°, 0°, 0°, 0°, 0°, 0°]. Tx channel TX2 has associated therewith initial phases for its subsequent FMCW radar chirps of [0°, 180°, 0°, 180°, 0°, 180°, 0°, 180°]. Thus, transmitter circuitry 610 may be configured to shift the phase of every second FMCW chirp of Tx channel TX2 by ±180° with respect to the phase of an FMCW chirp of Tx channel TX1. In the illustrated example, Tx channel TX3 has associated therewith initial phases for its subsequent FMCW radar chirps of [0°, 0°, 180°, 180°, 0°, 0°, 180°, 180°]. Thus, transmitter circuitry 610 may be configured to shift the phase of every second pair of FMCW chirps of Tx channel TX3 by ±180° with respect to the phase of FMCW chirps of Tx channel TX1. In the illustrated example, Tx channel TX4 has associated therewith initial phases for its subsequent FMCW radar chirps of [0°, 0°, 0°, 0°, 180°, 180°, 180°, 180°]. Thus, transmitter circuitry 610 may be configured to shift the phase of every second quadruple of FMCW chirps of the fourth Tx channel by ±180° with respect to the phase of FMCW chirps of Tx channel TX1. The skilled person having benefit from the present disclosure will appreciate that instead of ±180° any other predefined phase difference (e.g. ±30°) may be feasible as long as the binary phase modulation alphabet comprises two distinct phase offsets which can be applied to the FMCW chirps.

In the example of FIG. 8A, the CDM scheme used for CDM subset TX A is identical to the CDM scheme used for CDM subset TX B. Thus, Tx channel TX5 of subset TX B has associated therewith initial phase offsets of [0°, 0°, 0°, 0°, 0°, 0°, 0°, 0]° for its subsequent FMCW radar chirps. Like Tx channel TX2 of subset TX A, Tx channel TX6 of subset TX B has associated therewith initial phases of [0°, 180°, 0°, 180°, 0°, 180°, 0°, 180°] for its subsequent FMCW radar chirps. Like Tx channel TX3 of subset TX A, Tx channel TX7 of subset TX B has associated therewith initial phases of [0°, 0°, 180°, 180°, 0°, 0°, 180°, 180°] for its subsequent FMCW radar chirps. Like Tx channel TX4 of subset TX A, Tx channel TX8 of subset TX B has associated therewith initial phases [0°, 0°, 0°, 0°, 180°, 180°, 180°, 180°] for its subsequent FMCW radar chirps. The skilled person having benefit from the present disclosure will appreciate that FIG. 8A merely illustrates an example configuration and that other binary CDM schemes may be selected as well.

Figure 8B:
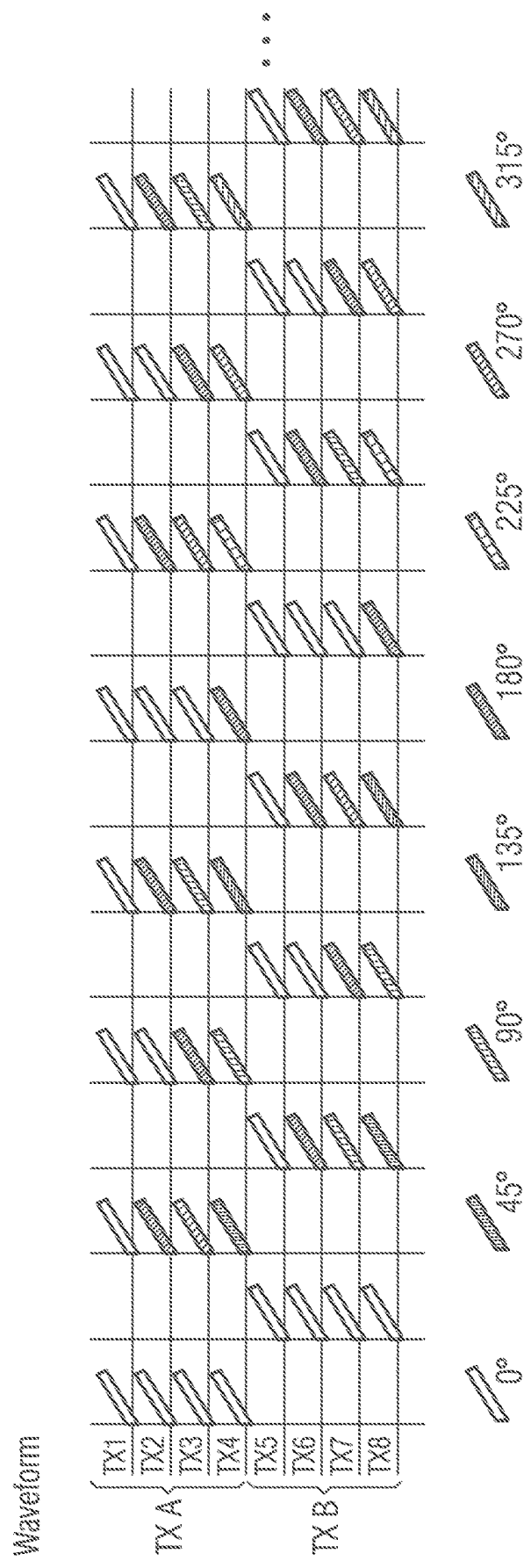
FIG. 8B illustrates a hybrid TDMA-CDMA MIMO radar transmission concept in accordance with another embodiment.

FIG. 8B illustrates a second example use case for $N_T=8$ Tx channels subdivided into $N_{TDM}=2$ disjoint subsets of Tx channels, each CDM subset comprising $N_{CDM}=4$ Tx channels. Here, the first and the second predefined CDM schemes between CDM subset TX A and CDM subset TX B are different (asymmetric). In the example of FIG. 8B, the respective phase modulation vectors are taken from an 8-ary phase modulation alphabet. In the illustrated example, Tx channel TX1 has associated therewith initial phases for its subsequent FMCW radar chirps of [0°, 0°, 0°, 0°, 0°, 0°, 0°, 0°]. Thus, transmitter circuitry 610 may be configured to keep the initial phase between two subsequent FMCW chirps of Tx channel TX1 identical. Tx channel TX2 has associated therewith initial phases for its subsequent FMCW radar chirps of [0°, 180°, 0°, 180°, 0°, 180°, 0°, 180°]. Thus, transmitter circuitry 610 may be configured to shift the initial phase between two subsequent FMCW chirps of Tx channel TX2 by ±180°. In the illustrated example, Tx channel TX3 has associated therewith initial phases for its subsequent FMCW radar chirps of [0°, 270°, 180°, 90°, 0°, 270°, 180°, 90°]. Thus, transmitter circuitry 610 may be configured to shift the initial phase between two subsequent FMCW chirps of Tx channel TX3 by 90° (here: counter-clockwise). In the illustrated example, Tx channel TX4 has associated therewith initial phases for its subsequent FMCW radar chirps of [0°, 45°, 90°, 135°, 180°, 225°, 270°, 315°]. Thus, transmitter circuitry 610 may be configured to shift the initial phase between two subsequent FMCW chirps of Tx channel TX4 by 45° (here: clockwise).

In the illustrated example, Tx channel TX5 of subset TX B (like Tx channel TX1 of subset TX A) has associated therewith initial phases for its subsequent FMCW radar chirps of [0°, 0°, 0°, 0°, 0°, 0°, 0°, 0°]. Like Tx channel TX2 of subset TX A, Tx channel TX6 of subset TX B has associated therewith initial phases for its subsequent FMCW radar chirps of [0°, 180°, 0°, 180°, 0°, 180°, 0°, 180°]. Thus, transmitter circuitry 610 may be configured to shift the phase between two subsequent FMCW chirps of Tx channel TX6 by 180°. In the illustrated example, Tx channel TX7 of subset TX B has associated therewith initial phases for its subsequent FMCW radar chirps of [0°, 90°, 180°, 270°, 0°, 90°, 180°, 270°]. Thus, transmitter circuitry 610 may be configured to shift the phase between two subsequent FMCW chirps of Tx channel TX7 by 90° (here: clockwise). Like Tx channel TX4 of subset TX A, Tx channel TX8 has associated therewith initial phases for its subsequent FMCW radar chirps of [0°, 45°, 90°, 135°, 180°, 225°, 270°, 315°]. Thus, transmitter circuitry 610 may be configured to shift the phase between two subsequent FMCW chirps of Tx channel TX8 by 45° (here: clockwise). The skilled person having benefit from the present disclosure will appreciate that other predefined 8-ary CDM schemes may be feasible.

As mentioned before, the MIMO radar apparatus 600 shown in FIG. 6 may also comprise a (monostatic or bistatic) receiver circuitry 620 for receiving reflections of the transmitted hybrid TDM and CDM MIMO waveforms. Receiver circuitry 620 comprises at least one Rx channel 622-1 (including an Rx antenna and analog and digital Rx circuits). Typically, receiver circuitry 620 will comprise a plurality of Rx channels 622-1, 622-2, . . . , 622-$N_R$. For high resolution radars, e.g., a combination of $N_T$=8 Tx channels and $N_R$=16 Rx channels would be conceivable, leading to a virtual array of 128 antenna elements.

Receiver circuitry 620 is configured to receive, via Rx channel 622-$n$ (n=1, . . . , $N_R$) and during a first TDM Rx time interval, a first Rx signal corresponding to a superposition of reflections of concurrent first FMCW radar signals which have been transmitted, via a first CDM subset of the plurality of Tx channels 612-1, 612-2, . . . , 612-$N_T$, with different phase offsets among different Tx channels of the first CDM subset in accordance with a first predefined CDM scheme. Receiver circuitry 620 is further configured to receive, via Rx channel 622-$n$ and during a second TDM Rx time interval subsequent to the first Rx time interval, a second Rx signal corresponding to a superposition of reflections of concurrent second FMCW radar signals transmitted, via a second CDM subset of the plurality of Tx channels, with different phase offsets among different Tx channels of the second CDM subset in accordance with a second predefined CDM scheme. The skilled person having benefit from the present disclosure will appreciate that similar signal processing may be performed for the other Rx channels 622-1, . . . , 622-$N_R$. Also, the skilled person having benefit from the present disclosure will appreciate that first and second TDM Rx time intervals may correspond to the first and second TDM Tx time intervals, respectively. For the sake of simplicity, the explanation of the proposed concept will involve one Rx channel.

During the first (e.g. odd) TDM Rx time intervals of a TDM frame, each Rx channel 622-$n$ (n=1, . . . , $N_R$) receives the reflections from the concurrently transmitted first FMCW radar signals with different phase offsets among different Tx channels in accordance with the first predefined CDM scheme. During the second (e.g. even) TDM Rx time intervals of a TDM frame, each Rx channel 622-$n$ receives the reflections from the concurrently transmitted second FMCW radar signals with different phase offsets among different Tx channels in accordance with the second predefined CDM scheme. The skilled person having benefit from the present disclosure will appreciate that the received CDMA like signals of each TDM time interval may be analog-to-digital converted for further signal processing.

Figure 9:
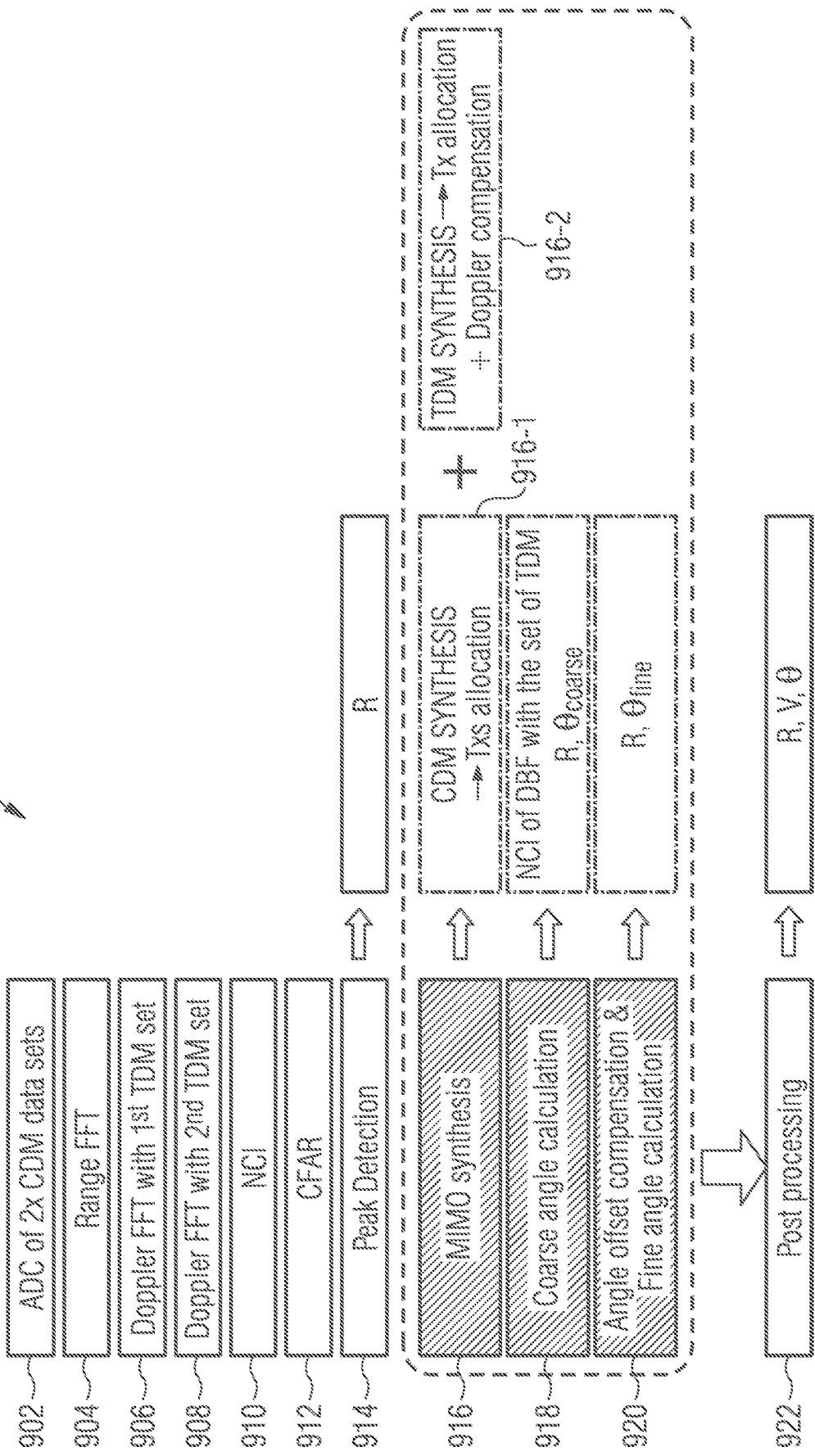
FIG. 9 shows a receiver process for hybrid TDMA-CDMA MIMO radar transmission concepts in accordance with embodiments.

As shown in the example Rx process 900 of FIG. 9, respective range FFTs (over fast time) can be performed (see 904) after Analog-to-Digital Conversion (ADC) (see 902) of the respective first and second receive signals (received first and second CDM data sets). That is to say, receiver circuitry 620 may be configured to perform a first range FFT of first Rx signals corresponding to a sequence of first (e.g. odd) TDM Rx time intervals of a TDM frame to generate first range signals associated with the first CDM subset of Tx channels. Receiver circuitry 620 may be further configured to perform at least a second range FFT of second Rx signals corresponding to a sequence of second (e.g. even) TDM Rx time intervals (of the TDM frame) to generate second range signals associated with the second CDM subset of Tx channels.

After the first and second range signals for the first and second CDM subsets have been generated by respective range FFTs, respective first and second Doppler FFTs (over slow time) can be performed to additionally generate velocity information (see acts 906, 908). Thus, receiver circuitry 620 may be configured to perform a first Doppler FFT of the first range signals to generate a first Doppler signal associated with the first CDM subset (subset A) of Tx channels. Receiver circuitry 620 may be further configured to perform a second Doppler FFT of the second range signal to generate a second Doppler signal associated with the second CDM subset (subset B) of Tx channels. After having performed these Doppler FFTs for all Rx channels 622-1, . . . , 622-$N_R$, respective 2D range-Doppler map data of all Rx channels and CDM subsets is available. Note that the Doppler signals, i.e., the outputs of the respective Doppler FFTs may still be ambiguous due to the TDM schemes where a time gap between TDM subsets contributes an additional phase change according to the targets' relative velocity. Range information, however, may be unambiguous. A probability of detection can be enhanced by summing or integrating the range-Doppler map data of all Rx channels. For example, a non-coherent integration (NCI) of the available range-Doppler maps can be performed (see 910). Then, adaptive algorithms such as Constant False Alarm Rate (CFAR) processing or Space-Time Adaptive Processing (STAP) can be used to mitigate the effect of clutter (see 912). The remaining range-Doppler bins (peaks) may identify targets (see 914) and indicate a respective target's distance (R) from the MIMO radar apparatus 600.

In order to get unambiguous Doppler (i.e., velocity) and angular (DoA) information, range-Doppler map data for every Tx-Rx channel pair may be generated. That is to say, the hybrid TDM and CDM MIMO waveforms may be synthesized to virtual Rx array data (see 916). This MIMO synthesis 916 comprises a CDM synthesis 916-1, where the $N_{CDM}$ individual Tx channels of a CDM subset are separated from each other. The MIMO synthesis 916 also comprises a TDM synthesis 916-2, where subsequent CDM Tx subsets in subsequent TDM time intervals are separated and phase compensated corresponding to the time gap with targets' relative velocity.

For the purpose of CDM synthesis 916-1, range-Doppler bins associated with different Tx channels of the first CDM subset may be separated based on comparing (correlating) the first Doppler signal (output of the first Doppler FFT) to the first predefined CDM scheme to obtain a first number of range-Doppler-maps corresponding to the number of Tx channels in the first CDM subset. Likewise, range-Doppler bins associated with different Tx channels of the second CDM subset may be separated based on comparing (correlating) the second Doppler signal (output of the second Doppler FFT) to the second predefined CDM scheme to obtain a second number of range-Doppler-maps corresponding to the number of Tx channels in the second CDM subset. The skilled person having benefit from the present disclosure will appreciate that this CDM synthesis 916-1 for Tx channel identification may be done for each Rx channel 622-1, ..., 622-$N_R$. In this way, range-Doppler map data of all Tx-Rx channel pairs may be obtained.

The signal from each Tx channel of a respective CDM subset can be separated from the Doppler signals (output of the respective Doppler FFTs). FIG. 10A illustrates phase modulation effects according to different CDM phase modulation vectors. FIG. 10A shows phase shifting effect in Doppler FFT associated with the phase distance between elements of modulation vectors. As a result of the initial phase modulation in Tx channel, original frequency indexes of Doppler FFT from scatters are shifted according to a phase shift effect shown in FIG. 10A. For example, if two Tx channels of a CDM subset are used with different phase modulation vectors, two different frequency indices appear after a Doppler FFT from the same range FFT bin. A distance between the frequency indices depends on the modulation vectors of the Tx channels.

Figure 10B:
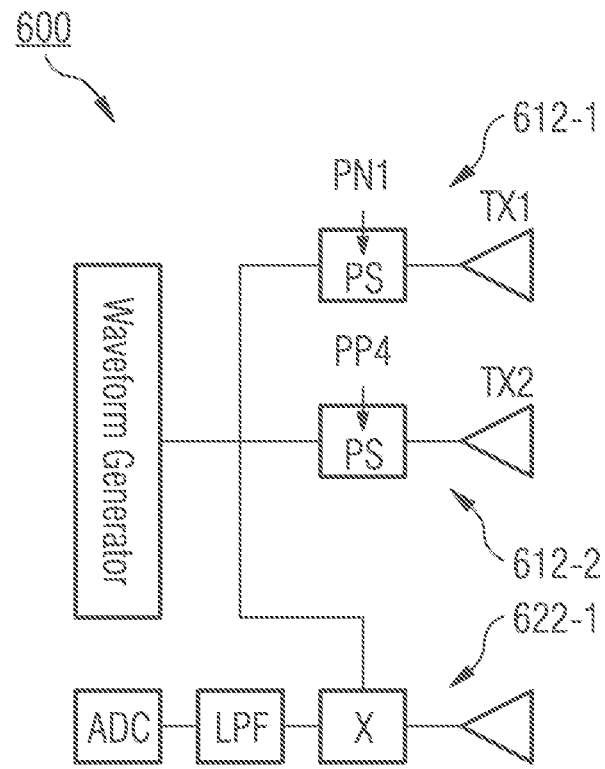
Figure 10C:
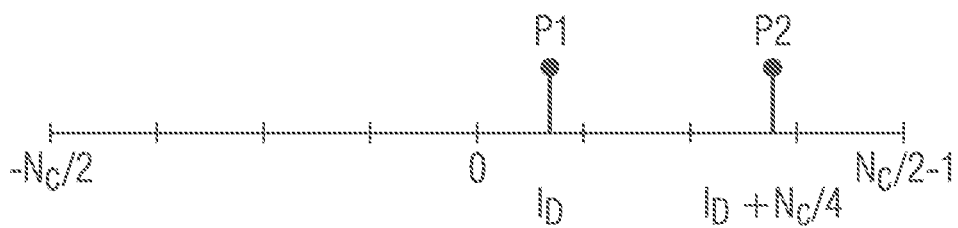

FIG. 10B illustrates a simple MIMO radar configuration for the purpose of understanding. Two Tx channels and one Rx channel are assumed. There are two different round-trip paths; one is TX1—target—receiver, another is TX2—target—receiver. The outputs of a target after Doppler FFT in those two paths are shown in FIG. 10C. The relative radial velocity of the target can be obtained from the frequency index of its peak signal. Complex information of Doppler FFT outputs associated with each Tx channel should be identified or differentiated from each other for proper allocation of received signals to synthesize the virtual antenna array. However, if two different Tx channels are transmitting at the same time without any phase modulation, the target from different channels lies on the same frequency bin thus providing a mixture of outputs rather than separated individual ones. In other words, all the outputs are superimposed with or distorted to each other due the two concurrent Tx outputs, consequently one cannot properly synthesize the virtual MIMO array.

If each Tx channel has phase shifters (PS) before its antenna, it can transmit signals with different phase modulations generated via the phase shifters. Each phase shifter may change its initial phases for every chirp in the FMCW waveform according to the phase modulation vector.

In the illustrated example, a phase modulation vector of PN1=[0°, 0°, 0°, 0°, 0°, 0°, 0°, 0°] is applied to Tx channel TX1, while a phase modulation vector of PP4=[0°, 90°, 180°, 270°, 0°, 90°, 180°, 270°] is applied to Tx channel TX2. The received signals are separated as shown in FIG. 10C. The peak signals whose values are above a threshold level, called CFAR threshold, may be taken as the possible target candidates. One can start with assuming the peak signal P1 with smaller index as a reflected signal associated with TX1. A next process is to find out signal from TX2 with PP4. Since phase modulation vector is chosen to get index difference of $N_C/4$ between TX1 and TX2, if there is a peak in the determined index or $N_C/4$ away from TX1, those two peaks can be paired for MIMO synthesis. If no such paired peak is found, next peak signal can be assumed as the one related with TX1. Note that $N_C$ denotes the total number of chirps per TDM frame.

After the CDM synthesis 916-1 for separating different Tx channels within a CDM subset has been performed, phase information from different CDM subsets may be merged via TDM synthesis 916-2 in order to obtain full virtual array synthesis and possibly maximum angular resolution.

Figure 11A:
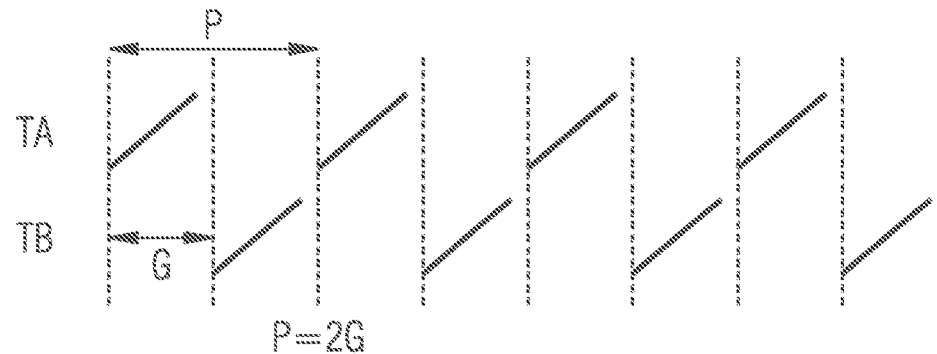
FIGS. 11A and 11B illustrate the effect of TDMA MIMO radar transmission on phase ambiguity.

For a better understanding of TDM synthesis 916-2, FIG. 11A illustrates the TDM principle between two CDM subsets (TA and TB). A TDM time slot is considered to have duration G and a TDM cycle for $N_{TDM}$=2 Tx channel subsets has duration P=2G. Between two successive TDM time slots for CDM subsets TA and TB, TDM introduces phase difference $\Phi_G$ due to the time gap G and the velocity v of target, which can be expressed as $$\Phi_G(v, G) = \frac{2\pi}{\lambda} \frac{2vG}{c}$$

According to embodiments of the present disclosure, $\Phi_G$ may be compensated to synthesize aperture. The velocity v can be measured from the outputs of the respective Doppler FFTs, but it may be ambiguous when targets' Doppler frequency becomes larger than a maximum Doppler sampling rate or pulse repetition frequency (PRF). Therefore, compensating phase may also have an ambiguity.

Figure 11B:
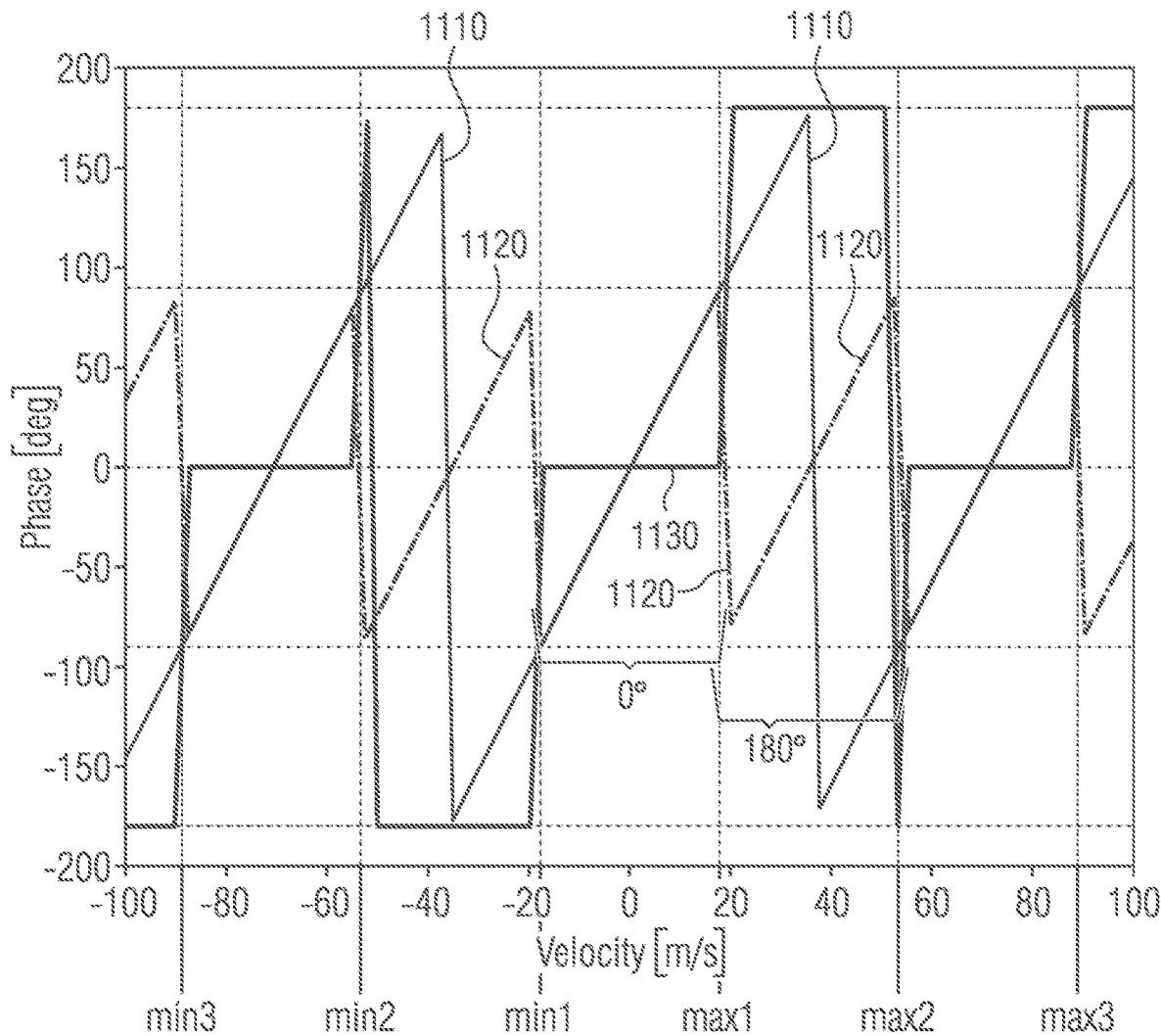

Line 1110 of FIG. 11B denotes the phase difference $\Phi_G$ between CDM subsets TA and TB with regards to the target's velocity. The amount of phase difference $\Phi_G$ to be compensated is linearly proportional to the target's velocity. If the target's velocity becomes larger or smaller than a maximum/minimum unambiguous velocity, the velocity becomes ambiguous. Line 1120 depicts the phase information reflecting the ambiguous effect. Line 1030 is the phase difference between lines 1110 and 1120. P can be designed to meet an integer multiple of G, so that possible compensation factors can be estimated. The number of compensation factor candidates are same as the integer multiplication factor of G to be P. For example, if P=2G, the phase compensation offset is either 0° or 180°, if P=3G, the phase compensation offset is 0°, 120°, −120°, etc.

Figure 12A:
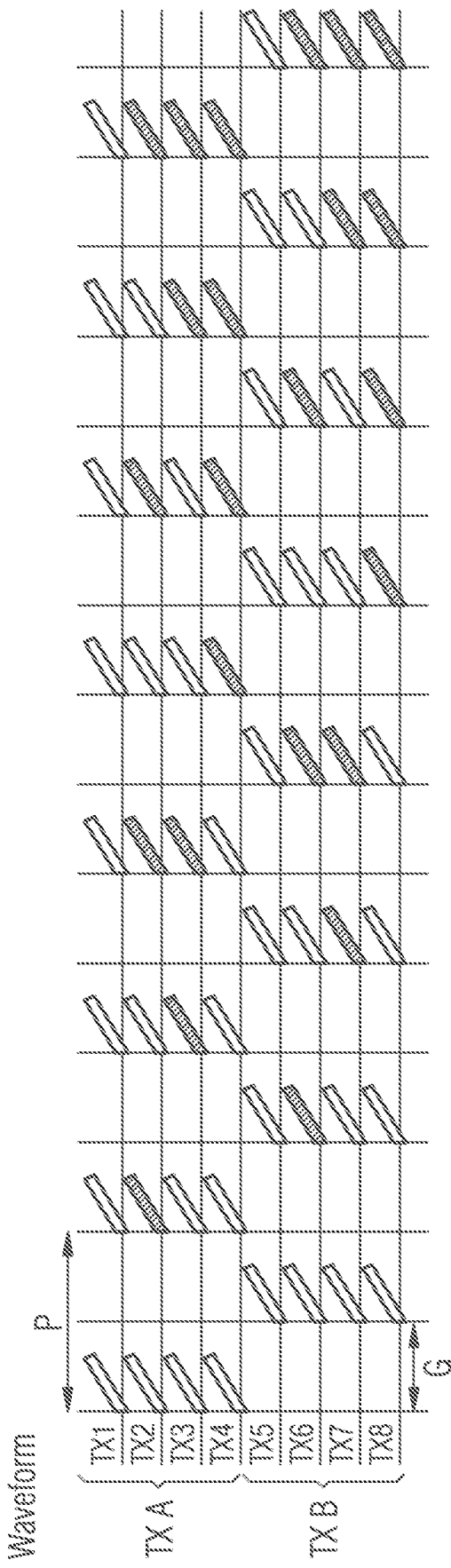
Figure 12A:
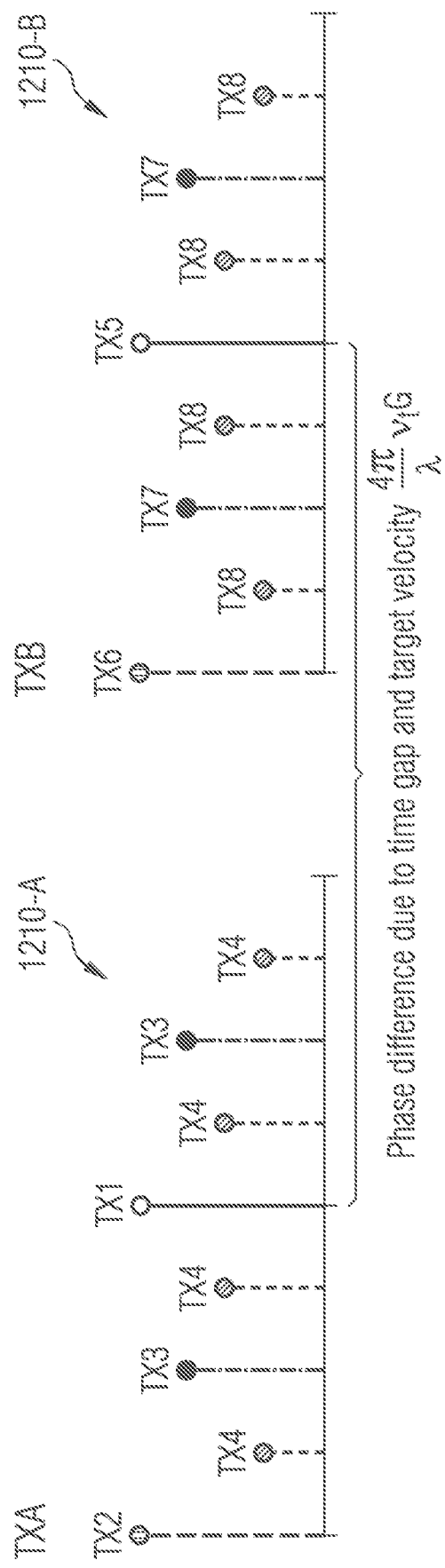

FIGS. 12A and 12B illustrate Doppler signals for the example use cases of FIGS. 8A and 8B.

1210-A denotes an output of a Doppler FFT related to first CDM subset TX A, while 1210-B denotes an output of a Doppler FFT related to second CDM subset TX B. The Doppler FFT outputs for CDM subsets TX A and TX B are separated by $\Phi_G$=(4π/λ)v due to the time gap G and the velocity v of the target. The individual Tx channels within CDM subsets TX A and TX B can be identified based on their associated phase modulation vectors as has been explained above.

With the results obtained so far, a coarse angle calculation 918 can be performed. In order to estimate a coarse angle ($\theta_{coarse}$) of one or more targets, NCI results from different CDM subsets may be used. For every Rx channel, CDM synthesis 916-1 has provided $N_{CDM}$ range Doppler maps for each of the $N_{TDM}$ CDM subsets. Thus, after CDM synthesis 916-1, we have $N_{TDM}$ virtual arrays, each virtual array having $N_{CDM} \times N_R$ elements. Thus, coarse angle calculation 918 can be performed by DoA processing over each of the $N_{TDM}$ virtual arrays separately. DoA processing can be done by performing a $3^{rd}$ FFT (angular FFT) across all antennas of a virtual array. Here, phase information of the detected peaks in the range-Doppler maps is used. Thus, receiver circuitry 620 may be further configured to determine a first (coarse) angular spectrum associated with selected first range-Doppler bins which are associated with the first CDM subset of Tx channels by performing DoA processing (angular FFT) of the selected first range-Doppler bins along a synthesized first virtual receive channel domain. The receiver circuitry 620 may be further configured to determine a second (coarse) angular spectrum associated with selected second range-Doppler bins which are associated with the second CDM subset of TX channels by performing DoA (angular FFT) processing of the selected second range-Doppler bins along a synthesized second virtual receive channel domain. Each coarse angular spectrum associated with range-Doppler bins from every TDM subset can be averaged or non-coherently integrated to get higher SNR.

If the coarse angle values are not yet sufficient, angle offset compensation and fine angle calculation 920 can be performed. This involves the process 916-2 which has been already described with reference to FIG. 11. Thus, the $N_{TDM}$ virtual arrays may be combined to one virtual array having $N_T \times N_R$ elements. When combining the $N_{TDM}$ virtual arrays, the number of phase compensation candidates are $N_{TDM}$. For example, if $N_{TDM}=2$, the phase compensation offset is either 0° or 180°, if $N_{TDM}=3$, the phase compensation offset is 0°, 120°, -120°, etc. For example, if $N_{TDM}=2$, phase information of the detected peaks of the second virtual array may be rotated by 0° and 180° when combining it with the phase information of the first virtual array. The amplitude of angle spectrum at target angle is higher when it is compensated correctly. The fine angle ($\theta_{fine}$) between $\theta_{coarse}-\theta_{th}$ to $\theta_{coarse}+\theta_{th}$ can be estimated by taking the Digital Beam Forming (DBF) vector containing the maximum value. The amplitude of angle spectrum at target angle is higher when it is compensated correctly. The processes of coarse and fine angle calculation 918, 920 for an example of $N_T=8$, $N_R=16$, and $N_{TDM}=2$ are illustrated in FIG. 13.

This, for fine angle estimation, the receiver circuitry 620 may be further configured to combine first angular information of the selected first range-Doppler bins (of first virtual array) with second angular information of the selected second range-Doppler bins (of second virtual array) by applying a number of different phase offset candidates to the second angular information. For each phase offset candidate, an angular spectrum along a synthesized virtual receive channel domain including the first and the second virtual receive channel domain may be determined. The angular spectrum may be determined by performing DoA processing of the selected range-Doppler bins along a synthesized overall virtual receive channel domain. The phase offset candidate yielding the highest angular spectrum denotes correct compensation of phase ambiguity between the first and the second range-Doppler bins.

The present disclosure proposes modulation and demodulation schemes for massive concurrent MIMO FMCW radar combining TDM and CDM MIMO properties. The present disclosure proposes CDM modulation for the sets of TDM modulation. It proposes a method for de-coupling Doppler and angle phase for MIMO synthesis and a method of identifying reflected signals to corresponding Tx channels. Virtual Array Allocation can be done based on pre-defined spectral distance among Txs.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A multiple-input multiple-output (MIMO) radar apparatus, comprising:
    transmitter circuitry, comprising a plurality of transmit channels, configured to:
        transmit, via a first subset of transmit channels of the plurality of transmit channels and during a first time interval, concurrent first frequency-modulated continuous-wave (FMCW) radar signals with different first phase offsets among different transmit channels of the first subset of transmit channels in accordance with a first predefined code division multiplexing scheme,
            wherein the first subset of transmit channels comprises a first transmit channel associated with a first phase modulation vector, and a second transmit channel, associated with a second phase modulation vector different from the first phase modulation vector; and
        transmit, via a second subset of transmit channels of the plurality of transmit channels and during a second time interval subsequent to the first time interval, concurrent second FMCW radar signals with different second phase offsets among different transmit channels of the second subset of transmit channels in accordance with a second predefined code division multiplexing scheme,
            wherein the second subset of transmit channels comprises a third transmit channel associated with a third phase modulation vector, and a fourth transmit channel, associated with a fourth phase modulation vector different from the third phase modulation vector.

2. The MIMO radar apparatus of claim 1, wherein the first time interval and the second time interval are different from each other and of a time division multiplexing scheme, and wherein the first subset of transmit channels are not transmitted during the second time interval and the second subset of transmit channels are not transmitted during the first time interval.

3. The MIMO radar apparatus of claim 1, wherein the first transmit channel is disjoint from the second transmit channel, and wherein the third transmit channel is disjoint from the fourth transmit channel.

4. The MIMO radar apparatus of claim 1, wherein the transmitter circuitry is further configured to:
    assign, to each transmit channel of the first subset of transmit channels, a unique sequence of the first different phase offsets applied to a first sequence of FMCW chirps of a respective transmit channel of the first subset of transmit channels; and
    assign, to each transmit channel of the second subset of transmit channels, a unique sequence of the second different phase offsets applied to a second sequence of FMCW chirps of a respective transmit channel of the second subset of transmit channels.

5. The MIMO radar apparatus of claim 1, wherein the transmitter circuitry is further configured to:
    select at least one of the first phase offsets or the second phase offsets from an M-ary phase modulation alphabet, wherein M is an integer equal to or greater than two.

6. The MIMO radar apparatus of claim 1, wherein the transmitter circuitry is further configured to:
    transmit first FMCW chirps of the first transmit channel with a first particular phase offset of the first phase offsets and second FMCW chirps of the second transmit channel with a second particular phase offset of the second phase offsets,
        wherein the first FMCW chirps are inter-leaved with the second FMCW chirps of the second transmit channel, and
        wherein the first particular phase offset and the second particular phase offset differ by a predetermined phase value.

7. The MIMO radar apparatus of claim 6, wherein, to transmit the first FMCW chirps and the second FMCW chirps, the transmitter circuitry is configured to:
    transmit, while four consecutive first FMCW chirps with a first phase value are transmitted via the first transmit channel, two consecutive first FMCW chirps via the second transmit channel with the first phase value followed by two consecutive second FMCW chirps via the second transmit channel with a second phase value.

8. The MIMO radar apparatus of claim 6, wherein, to transmit the first FMCW chirps and the second FMCW chirps, the transmitter circuitry is configured to:
    transmit, while eight consecutive first FMCW chirps with a first phase value are transmitted via the first transmit channel, four consecutive first FMCW chirps via the second transmit channel with the first phase value followed by four consecutive second FMCW chirps via the second transmit channel with a second phase value.

9. The MIMO radar apparatus of claim 1, wherein the first predefined code division multiplexing scheme and the second predefined code division multiplexing scheme are identical.

10. The MIMO radar apparatus of claim 1, wherein the first predefined code division multiplexing scheme and the second predefined code division multiplexing scheme are different.

11. The MIMO radar apparatus of claim 1, further comprising receiver circuitry comprising at least one receiver channel;
   wherein the at least one receiver channel is configured to:
      receive, during a first receive time interval, a first receive signal corresponding to reflections of the concurrent first FMCW radar signals; and
      receive, during a second receive time interval subsequent to the first receive time interval, a second receive signal corresponding to reflections of the concurrent second FMCW radar signals.

12. The MIMO radar apparatus of claim 11, wherein the receiver circuitry is further configured to:
   perform a first range fast Fourier transform (FFT) of first receive signals corresponding to a sequence of first receive time intervals to generate a first range signal associated with the first subset of transmit channels;
   perform a first Doppler FFT of the first range signal to generate a first Doppler signal associated with the first subset of transmit channels;
   separate range-Doppler bins associated with different transmit channels of the first subset of transmit channels based on comparing the first Doppler signal to the first predefined code division multiplexing scheme to obtain a first quantity of range-Doppler-maps corresponding to a quantity of transmit channels in the first subset of transmit channels;
   perform a second range FFT of second receive signals corresponding to a sequence of second receive time intervals to generate a second range signal associated with the second subset of transmit channels;
   perform a second Doppler FFT of the second range signal to generate a second Doppler signal associated with the second subset of transmit channels; and
   separate range-Doppler bins associated with different transmit channels of the second subset of transmit channels based on comparing the second Doppler signal to the second predefined code division multiplexing scheme to obtain a second quantity of range-Doppler-maps corresponding to a quantity of transmit channels in the second subset of transmit channels.

13. The MIMO radar apparatus of claim 12, wherein the receiver circuitry is further configured to:
   determine a first angular spectrum associated with the first quantity of range-Doppler-maps by performing Direction-of-Arrival (DoA) processing of the first quantity of range-Doppler-maps along a synthesized first virtual receive channel domain; and
   determine a second angular spectrum associated with the second quantity of range-Doppler-maps by performing DoA processing of the second quantity of range-Doppler-maps along a synthesized second virtual receive channel domain.

14. The MIMO radar apparatus of claim 12, wherein the receiver circuitry is further configured to:
   combine first angular information of the first quantity of range-Doppler-maps with second angular information of the second quantity of range-Doppler-maps by applying a quantity of different phase offset candidates to the second angular information; and
   determine, for each phase offset candidate, an angular spectrum along a synthesized virtual receive channel domain including the first quantity of range-Doppler-maps and the second quantity of range-Doppler-maps,
      wherein the phase offset candidate yielding a highest angular spectrum denotes a correct compensation of phase ambiguity between the first quantity of range-Doppler-maps and the second quantity of range-Doppler-maps.

15. A multiple-input multiple-output (MIMO) radar apparatus, comprising
   receiver circuitry comprising a receiver channel, configured to:
      receive, during a first receive time interval, a first receive signal corresponding to a superposition of reflections of concurrent first frequency-modulated continuous-wave (FMCW) radar signals transmitted, via a first subset of transmit channels of a plurality of transmit channels, with different first phase offsets among different transmit channels of the first subset in accordance with a first predefined code division multiplexing scheme,
         wherein the first subset of transmit channels comprises a first transmit channel associated with a first phase modulation vector, and a second transmit channel, associated with a second phase modulation vector different from the first phase modulation vector; and
      receive, during a second receive time interval subsequent to the first receive time interval, a second receive signal corresponding to a superposition of reflections of concurrent second FMCW radar signals transmitted, via a second subset of transmit channels of the plurality of transmit channels, with different second phase offsets among different transmit channels of the second subset in accordance with a second predefined code division multiplexing scheme,
         wherein the second subset of transmit channels comprises a third transmit channel associated with a third phase modulation vector, and a fourth transmit channel, associated with a fourth phase modulation vector different from the third phase modulation vector.

16. A multiple-input multiple-output (MIMO) radar apparatus, comprising:
   transmitter circuitry, comprising a plurality of transmit channels, configured to:
      transmit, via a first subset of transmit channels of the plurality of transmit channels and during a first transmit time interval, concurrent first frequency-modulated continuous-wave (FMCW) radar signals with different first phase offsets among different transmit channels of the first subset of transmit channels in accordance with a first predefined code division multiplexing scheme,
         wherein the first subset of transmit channels comprises a first transmit channel associated with a first phase modulation vector, and a second transmit channel, associated with a second phase modulation vector different from the first phase modulation vector, and
      transmit, via a second subset of transmit channels of the plurality of transmit channels and during a second transmit time interval subsequent to the first transmit time interval, concurrent second FMCW radar signals with different second phase offsets among different transmit channels of the second subset of transmit channels in accordance with a second predefined code division multiplexing scheme, wherein the second subset of transmit channels comprises a third transmit channel associated with a third phase modulation vector, and a fourth transmit channel, associated with a fourth phase modulation vector different from the third phase modulation vector; and receiver circuitry, comprising a receiver channel, configured to:

receive, during a first receive time interval, a first receive signal corresponding to reflections of the first FMCW radar signals; and receive, during a second receive time interval subsequent to the first receive time interval, a second receive signal corresponding to reflections of the second FMCW radar signals.

17. A multiple-input multiple-output (MIMO) radar transmission method, comprising:

transmitting, via a first subset of transmit channels of a plurality of transmit channels and during a first time interval, concurrent first frequency-modulated continuous-wave (FMCW) radar signals with different first phase offsets among different transmit channels of the first subset in accordance with a first predefined code division multiplexing scheme, wherein the first subset of transmit channels comprises a first transmit channel associated with a first phase modulation vector, and a second transmit channel, associated with a second phase modulation vector different from the first phase modulation vector; and transmitting, via a second subset of transmit channels of the plurality of transmit channels and during a second time interval subsequent to the first time interval, concurrent second FMCW radar signals with different second phase offsets among different transmit channels of the second subset in accordance with a second predefined code division multiplexing scheme, wherein the second subset of transmit channels comprises a third transmit channel associated with a third phase modulation vector, and a fourth transmit channel, associated with a fourth phase modulation vector different from the third phase modulation vector.

18. A multiple-input multiple-output (MIMO) radar reception method, the method comprising receiving, during a first receive time interval, a first receive signal corresponding to a superposition of reflections of concurrent first frequency-modulated continuous-wave (FMCW) radar signals transmitted, via a first subset of transmit channels of a plurality of transmit channels, with different first phase offsets among different transmit channels of the first subset of transmit channels in accordance with a first predefined code division multiplexing scheme, wherein the first subset of transmit channels comprises a first transmit channel associated with a first phase modulation vector, and a second transmit channel, associated with a second phase modulation vector different from the first phase modulation vector; and receiving, during a second receive time interval subsequent to the first receive time interval, a second receive signal corresponding to a superposition of reflections of concurrent second FMCW radar signals transmitted, via a second subset of transmit channels of the plurality of transmit channels, with different second phase offsets among different transmit channels of the second subset of transmit channels in accordance with a second predefined code division multiplexing scheme, wherein the second subset of transmit channels comprises a third transmit channel associated with a third phase modulation vector, and a fourth transmit channel, associated with a fourth phase modulation vector different from the third phase modulation vector.

19. The MIMO radar apparatus of claim 16, wherein the first transmit time interval and the second transmit time interval are different from each other and of a time division multiplexing scheme, and wherein the first subset of transmit channels are not transmitted during the second transmit time interval and the second subset of transmit channels are not transmitted during the first transmit time interval.

20. The MIMO radar apparatus of claim 16, wherein the first transmit channel is disjoint from the second transmit channel, and wherein the third transmit channel is disjoint from the fourth transmit channel.

* * * * *